US012639619B2

(12) United States Patent
Kim et al.

(10) Patent No.: US 12,639,619 B2
(45) Date of Patent: May 26, 2026

(54) ARTIFICIAL INTELLIGENCE-BASED MULTI-GOAL-AWARE DEVICE SAMPLING

(71) Applicant: Samsung Electronics Co., Ltd., Suwon-si (KR)

(72) Inventors: Hong-hoe Kim, Aliso Viejo, CA (US); Yingnan Zhu, Irvine, CA (US); Xiangyuan Zhao, Irvine, CA (US); Hari Nayar, Hayward, CA (US); Praveen Pratury, Mountain House, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1113 days.

(21) Appl. No.: 17/368,168

(22) Filed: Jul. 6, 2021

(65) Prior Publication Data

US 2023/0017951 A1 Jan. 19, 2023

(51) Int. Cl.
| | |
|---|---|
| *G06N 20/00* | (2019.01) |
| *G06F 11/34* | (2006.01) |
| *G06N 3/02* | (2006.01) |

(52) U.S. Cl.
CPC ......... G06N 20/00 (2019.01); G06F 11/3438 (2013.01); G06F 11/3452 (2013.01); G06N 3/02 (2013.01)

(58) Field of Classification Search
CPC ...... G06N 20/00; G06N 3/02; G06F 11/3438; G06F 11/3452
See application file for complete search history.

(56) References Cited

U.S. PATENT DOCUMENTS

| | | | |
|---|---|---|---|
| 9,116,958 | B2 | 8/2015 | Cormode et al. |
| 10,101,921 | B2 | 10/2018 | Kelkar et al. |
| 10,805,377 | B2 | 10/2020 | Grill et al. |
| 2009/0163183 | A1 | 6/2009 | O'Donoghue et al. |

(Continued)

FOREIGN PATENT DOCUMENTS

| | | |
|---|---|---|
| CN | 103926564 B | 8/2016 |
| EP | 2988236 B1 | 6/2019 |
| KR | 20160038902 A | 4/2016 |

OTHER PUBLICATIONS

Paszke, Adam; Reinforcement Learning (DQN) Tutorial; Apr. 21, 2021 (Year: 2021).*

(Continued)

*Primary Examiner* — Tamara T Kyle
*Assistant Examiner* — Jacqueline C. Meyer

(57) ABSTRACT

An electronic device includes at least one processor configured to obtain user data associated with a plurality of devices from multiple data sources. The at least one processor is also configured to determine a static weight for each of the plurality of devices based on at least one source of the multiple data sources. The at least one processor is further configured to identify a portion of the plurality of devices that represents the plurality of devices based on the static weight and a dynamic weight. In addition, the at least one processor is configured to determine the dynamic weight for each of the portion of the plurality of devices while the portion of the plurality of devices is identified, where the dynamic weight is based on one or more sources of the multiple data sources.

20 Claims, 14 Drawing Sheets

(56) References Cited

U.S. PATENT DOCUMENTS

| | | | | |
|---|---|---|---|---|
| 2014/0244710 | A1* | 8/2014 | Sharma | H04L 67/63 |
| | | | | 709/201 |
| 2016/0205438 | A1 | 7/2016 | Lee | |
| 2016/0379268 | A1 | 12/2016 | Song et al. | |
| 2017/0076323 | A1* | 3/2017 | Palanciuc | G06Q 30/0255 |
| 2018/0225709 | A1* | 8/2018 | Ferber | G06Q 30/0242 |
| 2019/0004712 | A1* | 1/2019 | Kelkar | G06F 3/0688 |
| 2019/0197073 | A1* | 6/2019 | Liu | G06Q 30/0269 |
| 2020/0364567 | A1 | 11/2020 | Oh et al. | |
| 2020/0401948 | A1 | 12/2020 | Ma et al. | |

OTHER PUBLICATIONS

Nikishin, Evgenii et al.; Improving Stability in Deep Reinforcement Learning with Weight Averaging; 2018 (Year: 2018).*
Bernton, Espen et al.; Locally Weighted Markov chain Monte Carlo; Jul. 1, 2015 (Year: 2015).*
Bohn, Roger et al.; Measuring Consumer Information; Feb. 17, 2012 (Year: 2012).*
Paszke, Reinforcement Learning (DQN) Tutorial, Apr. 4, 2021 (Year: 2021).*
Bohn et al., Measuring Consumer Information, 2012 (Year: 2012).*
Nikishin et al., Improving Stability in Deep Reinforcement Learning with Weight Averaging, Oct. 8, 2018 (Year: 2018).*
Bernton et al., Locally Weighted Markov Chain Monte Carlo, Jun. 2015 (Year: 2015).*
Adam B, What Exactly Should We Be Logging, Mar. 2021 (Year: 2021).*
Anari et al., "Monte Carlo Markov Chain Algorithms for Sampling Strongly Rayleigh Distributions and Determinantal Point Processes," JMLR: Workshop and Conference Proceedings, vol. 49, 2016, 13 pages.
Gleich, "PageRank Beyond the Web," Society for Industrial and Applied Mathematics, Siam Review, vol. 57, No. 3, 2015, 43 pages.
Zhong et al., "Two Freshness Metrics for Local Cache Refresh," 2018 IEEE International Symposium on Information Theory (ISIT), Jun. 2018, 5 pages.
International Search Report and Written Opinion of the International Searching Authority dated Oct. 4, 2022 in connection with International Patent Application No. PCT/KR2022/009202, 10 pages.

* cited by examiner

ARTIFICIAL INTELLIGENCE-BASED MULTI-GOAL-AWARE DEVICE SAMPLING

TECHNICAL FIELD

This disclosure relates generally to sampling. More specifically, this disclosure relates to artificial intelligence-based multi-goal-aware device sampling.

BACKGROUND

The use of electronic devices has greatly expanded largely due to their usability, convenience, computing power, and the like. For example, some electronic devices support functions such as digital media playback, game play, electronic book (e-book) reading, digital image capture, calendar scheduling, wireless communications, and Internet searching. The various functions can produce usage data that can be used to understand the usage behavior and patterns of a user for tailoring sales and marketing purposes. The amount of usage data is increasing due to the increase of electronic devices in the marketplace. As such, understanding usage behavior from usage data of a user is more difficult and expensive.

SUMMARY

This disclosure provides artificial intelligence-based multi-goal-aware device sampling.

In a first embodiment, a method includes obtaining user data associated with a plurality of devices from multiple data sources. The method also includes determining a static weight for each of the plurality of devices based on at least one source of the multiple data sources. The method further includes identifying a portion of the plurality of devices that represents the plurality of devices based on the static weight and a dynamic weight. In addition, the method includes determining the dynamic weight for each device of the portion of the plurality of devices while the portion of the plurality of devices is identified, where the dynamic weight is based on one or more sources of the multiple data sources.

In a second embodiment, an electronic device includes at least one processor configured to obtain user data associated with a plurality of devices from multiple data sources. The at least one processor is also configured to determine a static weight for each of the plurality of devices based on at least one source of the multiple data sources. The at least one processor is further configured to identify a portion of the plurality of devices that represents the plurality of devices based on the static weight and a dynamic weight. In addition, the at least one processor is configured to determine the dynamic weight for each device of the portion of the plurality of devices while the portion of the plurality of devices is identified, where the dynamic weight is based on one or more sources of the multiple data sources.

In a third embodiment, a non-transitory machine-readable medium contains instructions that when executed cause at least one processor of an electronic device to obtain user data associated with a plurality of devices from multiple data sources. The medium also contains instructions that when executed cause the at least one processor to determine a static weight for each of the plurality of devices based on at least one source of the multiple data sources. The medium further contains instructions that when executed cause the at least one processor to identify a portion of the plurality of devices that represents the plurality of devices based on the static weight and a dynamic weight. In addition, the medium contains instructions that when executed cause the at least one processor to determine the dynamic weight for each device of the portion of the plurality of devices while the portion of the plurality of devices is identified, where the dynamic weight is based on one or more sources of the multiple data sources.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" in accordance with this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

As noted above, usage data (such as mobile device or television usage history) that is generated by an electronic device can be used to understand the usage behavior of a user of the device. The usage data can be used for identifying a target audience for sales and marketing purposes for similar content. Understanding the usage behavior from the user usage data is becoming more difficult and expensive due to the increasing number of electronic devices in the marketplace. For example, in order to understand the usage behavior of a user from the usage data, automatic content recognition (ACR) for content that is being viewed can be performed, but ACR is computationally demanding since watermarking and fingerprinting content is performed.

As a result, sampling of the electronic devices can be used to select a certain number of devices that represent a larger number of devices. The usage behavior of the sampled devices can be used to understand usage behaviors of the larger number of devices. However, sampling devices may only select electronic devices that are currently active. As such, the sampled devices may not be a valid representation of the overall activity of the larger number of devices.

This disclosure describes various systems and methods for identifying and selecting electronic devices from both active and inactive devices that represent device activity within various demographic categories to support device sampling. Active devices have a high or regular activity level, while inactive devices have a low activity level but still include a usage behavior. For example, embodiments of the present disclosure provide systems and methods for selecting certain devices that represent a larger collection of devices in order to understand the usage behaviors of the larger collection of devices.

Figure 1:
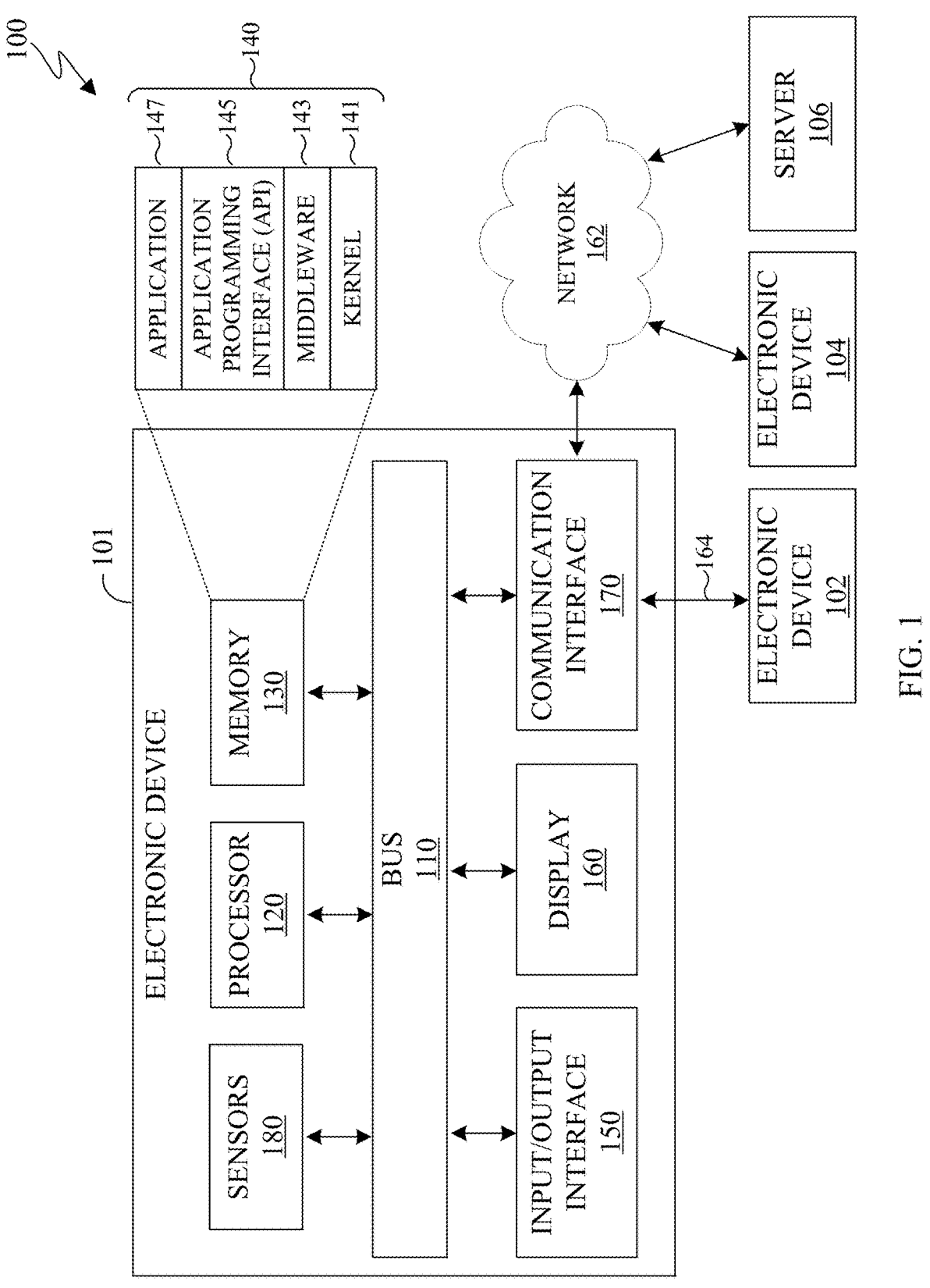
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (1/O) interface 150, a display 160, a communication interface 170 and sensors 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). Among other things, the processor 120 can identify a portion of a plurality of devices to be used for sampling.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that identify a portion of a plurality of devices to be used for sampling. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

For example, the I/O interface 150 can transfer data representing an input (such as a voice input, a touch input, and the like) to one or more other components of the electronic device 101.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The electronic device 101 further includes one or more sensors 180 that can meter a physical quantity or detect an activation state of the electronic device 101 and convert metered or detected information into an electrical signal. For example, one or more sensors 180 can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a biophysical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can also include an inertial measurement unit, which can include one or more accelerometers, gyroscopes, and other components. The sensor(s) 180 can further include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can optionally support the electronic device 101 by performing or supporting at least one of the operations (or functions) implemented on the electronic device 101. For example, the server 106 can include a processing module or processor that may support the processor 120 implemented in the electronic device 101. In some embodiments, the server 106 may include one or more applications for identifying one or more electronic devices to sample as discussed below. For example, the server 106 may identify a portion of a plurality of devices to be used for sampling.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
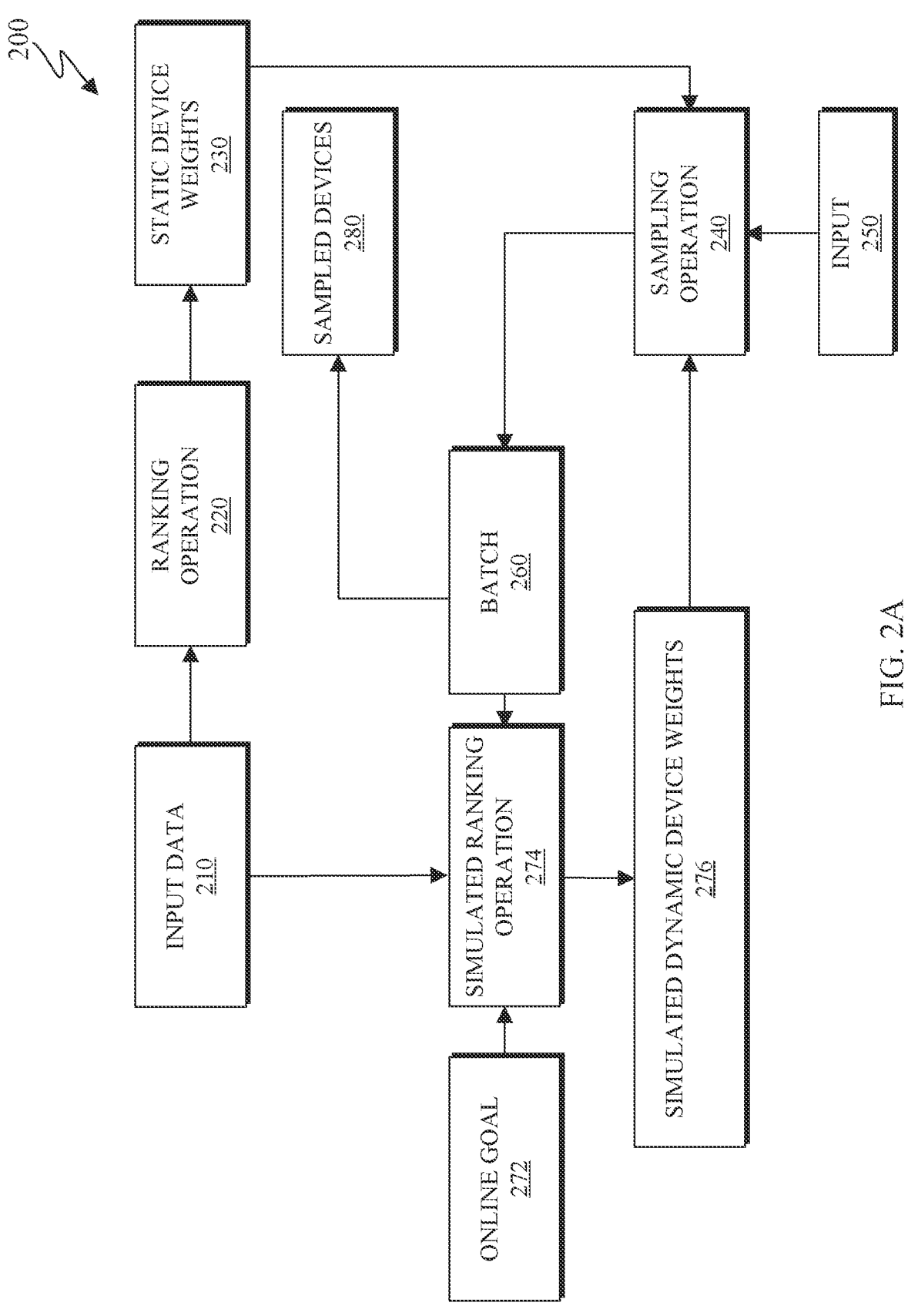
FIG. 2A illustrates an example sampling device in accordance with this disclosure.
Figure 2B:
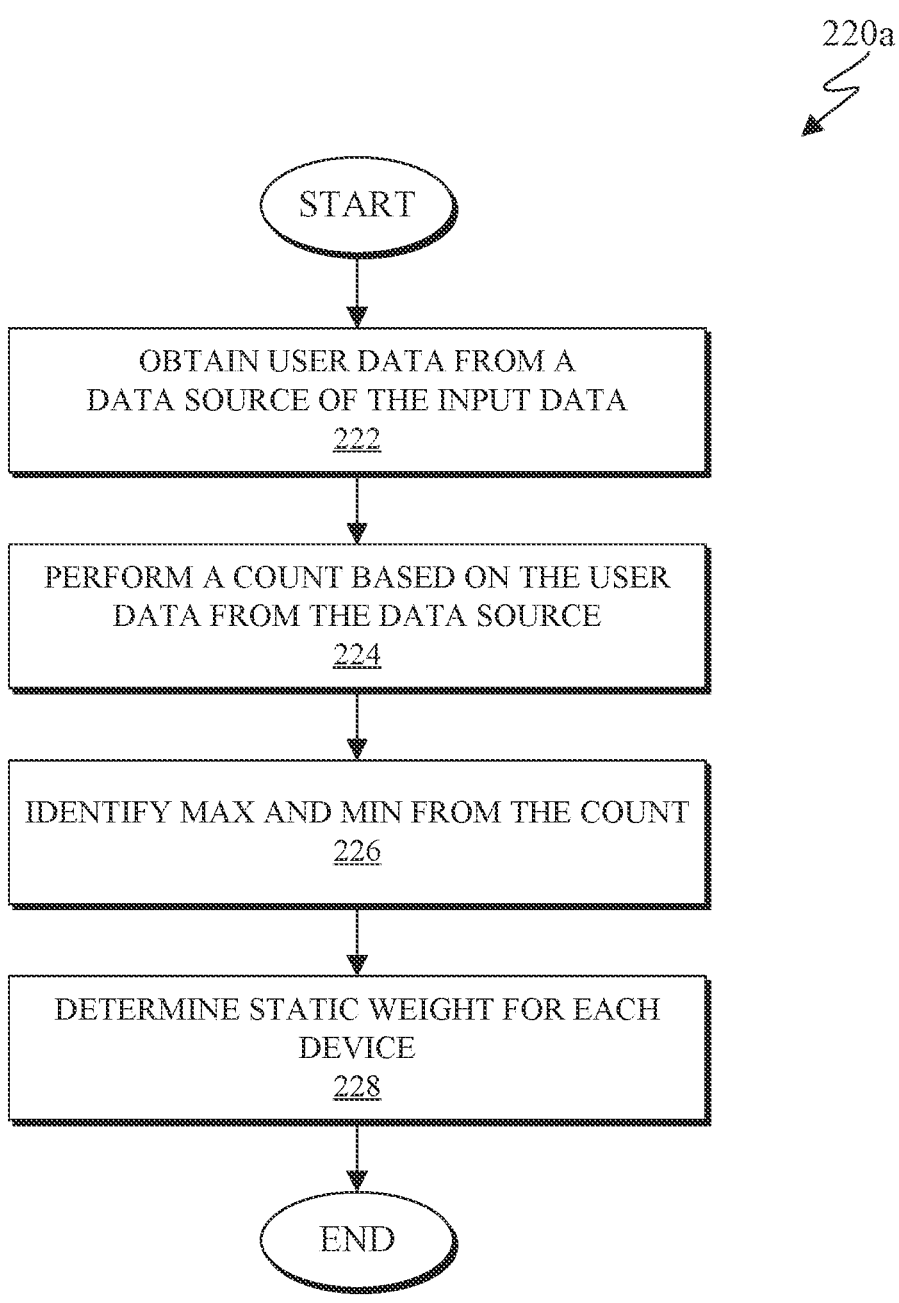
FIG. 2B illustrates an example process for determining static weights for electronic devices in accordance with this disclosure.

FIG. 2A illustrates an example sampling device 200 in accordance with this disclosure. FIG. 2B illustrates an example process 220a for determining static weights for electronic devices in accordance with this disclosure. For ease of explanation, the sampling device 200 of FIG. 2A may be described as representing the electronic device 101 shown in FIG. 1, and the process 220a of FIG. 2B may be described as being performed by or involving the electronic device 101 shown in FIG. 1. However, the sampling device 200 shown in FIG. 2A may represent and the process 220a of FIG. 2B may be used with any other suitable electronic device (such as the server 106) and in any other suitable system.

In some embodiments, device usage information may represent a sequence of user actions that are performed on an electronic device. The electronic device can be identified by a unique device identifier (ID). Also, in some embodiments, the device usage information can be identified based on content ID and a time stamp. The content ID may include a program name (application ID or program ID), and the time stamp can indicate start and stop times of the content that was being used or viewed. Further, in some embodiments, the device usage information may be represented as a set of M devices. In particular embodiments, the device usage information for a total number of devices before sampling can be represented as:

$$D_{universe} = \{d_1, d_2, \ldots, d_M\} \tag{1}$$

Here, the expression "universe" represents the total number of devices before sampling, and the expression "d" represents a particular device associated user actions (such as device ID, content ID, time stamp, and the like). In accordance with the techniques described in this disclosure, a subset of electronic devices can be identified and selected in order to reduce the number of devices from M to N (where N is less than M), which is referred to as sampling. Here, the device usage information for the sampled device set can be represented as:

$$D_{sample} = \{d_1, d_2, \ldots, d_N\} \tag{2}$$

To sample electronic devices, the usage information of the sampled devices and the universe of devices should be similar. Equation (3) and Equation (4) below describe a sampling function that may increase or maximize the similarity values between the universe of devices and the sampled devices. For example, Equation (3) describes that a list of devices in the universe is to be represented by a list of sampled devices, and Equation (4) ensures that the sample devices are similar to the universe of devices.

$$F(D_{universe}) = D_{sample} \tag{3}$$

$$\text{argmax}_f \text{Similarity}(F(D_{universe}), D_{universe}) \tag{4}$$

As shown in FIG. 2A, input data 210 includes various types of usage data and may be said to represent various data sources. For example, the input data 210 can include TV viewership data, cross-device data, liner ads viewership data, cross-device ads viewership data, application usage data, game usage data, demographic data, and the like. The TV viewership data is associated with an electronic device and may include a program name, a watch time, a channel name, and the like. For example, the TV viewership data, when stored within an information repository, can be expressed as [device_id, program_name, view_start_time, view end time]. The cross-device data is associated with at least one electronic device that is connected to another device (which is referred to as a primary electronic device). For example, a primary electronic device such as a TV can be physically or wirelessly connected to one or more other electronic devices. The other electronic devices may include an electronic device that provides streaming services, a gaming console, or one or more electronic devices for playing videos (such as a BLU-RAY or DVD player). Cross-device data may include device IDs, device types, and the like. The liner ads viewership data and the cross-device ads viewership data include information regarding advertisements that are played on a device. For example, the liner ads viewership data may include an ad ID, a watch time, a provider, and the like. The cross-device ads viewership data may include an ad ID, watch time, provider, cross-device ads binding request activity, and the like. The application usage data indicates a type or category of the electronic device, such as a TV, a smart phone, or the like, that accessed a particular application. The application usage data may include the device ID, an application ID, usage time, a provider, and the like. The game usage data includes information about a game that was played on an electronic device. The game usage data may include a game ID, a duration of play, a device ID that executed the game, a device ID that displayed the game if applicable, and the like. In some embodiments, a device ID for a device that executed the game and a device ID for a device that displayed the game are the same. The demographic data may include demographic information about the user (or users) of an electronic device. For example, the demographic data may include location information (such as the country, state, city, and/or postal code of the user), biographical information (such as gender, age, and educational level), and the like.

The input data 210 is provided to a ranking operation 220 to generate static device weights 230. The ranking operation 220 determines a static weight for each of the devices described in the various types of data from the input data 210. In some embodiments, the ranking operation 220 determines the weights of the devices based on one or more of the data sources in the input data 210. For example, the ranking operation 220 may determine static weights for all of the devices based on the information of the TV viewership data. In some embodiments, the ranking operation 220 ranks the devices based on a time duration that a video game is played on a device, a number of devices that are connected to a primary electronic device, and a quantity of TV (according to a time duration or number of watching sessions) that is viewed on the device. As an example, to determine the static weight for a device based on a number of sessions that a TV show was watched, the ranking operation 220 may count the number of TV watching sessions each device is involved with over a period of time. The ranking operation 220 may determine a weight associated with each of the devices based on the amount of TV that a user watched on a specific device. The ranking operation 220 is described in greater detail below with respect to FIG. 2B.

The static device weights 230 may be stored in a database or other storage device. However, in some cases, the information that the ranking operation 220 uses to determine the static device weights 230 is not stored. For example, each of the static device weights 230 may be stored as a device ID and a corresponding weight that is determined based on the input data 210. Depending on the implementation, a single electronic device may have one or multiple static device weights 230. Multiple static device weights 230 may, for instance, correspond to different data sources, such as a viewership weight, a game usage weight, a cross-device weight, and the like.

The input data 210, a list of devices in a batch 260, and an online goal 272 are provided to a simulated ranking operation 274, which generates simulated dynamic device weights 276. The batch 260 is a list of devices that a sampling operation 240 identifies for sampling. Each time the sampling operation 240 selects one of the devices to sample, the device ID corresponding to the selected device can be stored in the batch 260. Initially, the batch 260 may be empty and is filled over a period of time with each device ID that the sampling operation 240 selects. In some embodiments, after a number of device IDs are in the batch 260, the batch 260 can move the device IDs to an information repository, such as in the form of a list of sampled devices 280. The list of sampled devices 280 can store the device IDs of devices for further processing. For example, the list of sampled devices 280 may represent a specific group of devices based on a particular demographic. The list of sampled devices 280 can be used by various applications to extract usage behaviors of users of the devices for creating personalized sales and marketing information for the users of those devices and users that share similar demographics.

The sampling operation 240 performs the sampling to select a portion of the devices that represent the universe of devices. For example, the sampling operation 240 receives the static device weights 230, the simulated dynamic device weights 276, and an input 250. Depending on the implementation, the sampling operation 240 may randomly select one or more electronic devices via an exploration operation and/or deliberately select one or more electronic devices via an exploitation operation. In some embodiments, the exploitation operation may include a deep reinforced learning operation, a Monte Carlo operation, or a combination thereof. Based on the input 250, the sampling operation 240 determines a number (or percentage) of devices that are selected for sampling based on the exploration operation and the exploitation operation. For example, the input 250 may notify the sampling operation 240 to select 50% of the devices within the universe of devices. The sampling operation 240 is described in greater detail below with reference to FIGS. 3, 4A, 5, 6, and 7A.

The online goal 272 is a preset goal associated with demographics data or other information that identifies a goal for the sampling. For example, the online goal 272 may specify that devices from the batch 260 are to be distributed according to a particular demographic, such as location, age, and the like. As a particular example, the online goal 272 may specify that the simulated ranking operation 274 is to distribute the batched devices so that each state of the United States is evenly distributed and represented. As another particular example, the online goal 272 may specify that the simulated ranking operation 274 is to weight the batched devices by a particular age or range of ages.

The simulated ranking operation 274 determines the dynamic weights for the device from the batch 260 according to the online goal 272. For example, when a subsequent device from the batch 260 satisfies the online goal 272, the device may be determined to have a higher dynamic weight than a device that does not satisfy the online goal 272. In some embodiments, the simulated ranking operation 274 determines the dynamic weight for each respective device while the sampling operation 240 is being performed. As a result, the simulated ranking operation 274 can determine the dynamic weights for the devices based on the input data 210, the online goal 272, and the sampled devices from the batch 260.

As one example, if the online goal 272 is based on a location (such as by state), the simulated ranking operation 274 may determine the dynamic weight for each device in order to equally distribute the devices from the batch 260. Initially, an online_status_vector can be initialized to all zeros by region, such as when expressed as [CA: 0, TX: 0, AZ: 0, . . . ]. When a new device is added to the batch 260 by the sampling operation 240, the simulated ranking operation 274 updates the online_status_vector and determines whether the devices represented by the online_status_vector are distributed evenly. Thus, if the vector is [CA: 10000, TX: 10, AZ: 0, . . . ], the vector is extremely unbalanced since there are far more devices from California as compared to other states. In this example, the simulated ranking operation 274 can assign higher dynamic weights to subsequent devices selected by the sampling operation 240 that are from Texas or Arizona while assigning lower dynamic weights to subsequent devices selected by the sampling operation 240 from California. This helps to obtain a more evenly distributed (weighted) distribution.

As another example, the online goal 272 may be based on age. Initially, an online_status_vector may be initialized to all zeroes for all age groups, such as when expressed as [11-20 years: 0, 21-30 years: 0, 31-40 years: 0, . . . ]. When a new device is added to the batch 260 by the sampling operation 240, the simulated ranking operation 274 updates the online_status_vector and determines whether the devices represented by the online_status_vector are distributed evenly. If the vector is [11-20 years: 10000, 21-30 years: 0, 31-40 years: 0, . . . ], the vector is again very unbalanced since there are far more devices from the age group of users between 11-20. In this example, the simulated ranking operation 274 can assign higher dynamic weights to subsequent devices selected by the sampling operation 240 that are associated with users older than 20 while assigning lower dynamic weights to subsequent devices selected by the sampling operation 240 that are associated with users who are between 11 and 20 years old. Again, this helps to obtain a more evenly distributed (weighted) distribution.

As yet another example, the online goal 272 may be based on phone app usage. Initially, an online_status_vector may be initialized to all zeros for all applications, such as when expressed as [game app: 0, social app: 0, finance app: 0, . . . ]. When a new device is added to the batch 260 by the sampling operation 240, the simulated ranking operation 274 updates the online_status_vector and determines whether the devices represented by the online_status_vector are distributed evenly. If the vector is [game app: 10000, social app: 0, finance app: 0, . . . ], the vector is very unbalanced since there are far more devices that are using game applications than social media or finance applications. In this example, the simulated ranking operation 274 can assign higher dynamic weights to subsequent devices selected by the sampling operation 240 that are associated with social or finance applications while assigning lower dynamic weights to subsequent devices selected by the sampling operation 240 that are used for game applications. Again, this helps to obtain a more evenly distributed (weighted) distribution.

As shown in FIG. 2B, the process 220a describes the ranking operation 220 of FIG. 2A, which determines static weights for electronic devices. In step 222, the ranking operation 220 obtains user data from a data source of the input data 210. For example, if the data source is TV viewership data, the user data may include a device ID, a program name, and start and end times of a watched program. If the data source is game usage data, the user data may include a device ID, a game ID, and start and end times of playing the game. If the data source is cross-device data, the user data may include a device ID of a primary electronic device and a device ID of each device connected to the primary electronic device. In some embodiments, information from more than one data source is obtained and used to determine the static weight of a device, such as when TV viewership data and cross-device data are obtained in step 222 and used throughout the process 220*a*.

In step 224, the ranking operation 220 performs a count on the user data of a particular data source. For example, if the data source is TV viewership data, the ranking operation 220 may count the number of times each device is used to watch TV over a certain period of time. As a particular example, the ranking operation 220 may determine that a first device is used to watch TV three times, a second device is used to watch TV one time, and a third device is used to watch TV ten times over a one-day period. In step 226, the ranking operation 220 identifies the device that has the highest count and the device that has the lowest count. Continuing the example above, the ranking operation 220 may determine that the third device is used to watch the most TV and the second device is used to watch the least TV.

In step 228, the ranking operation 220 determines the static weight for each device. In some cases, the static weight of a device may be determined as follows:

$$\text{Static Weight for device}_i = \frac{x - \text{min\_session\_count}}{\text{max\_session\_count} - \text{min\_session\_count}} \quad (5)$$

Here, $x$ is the session count for device$_i$, and min_session_count and max_session_count represent the values identified in step 226. Continuing the above example, the static weight for the first device would be 0.22 since the session count time for the first device is three, the min_session_count value is 1, and the max_session_count value is 10. Similarly, the static weight for the second device is 0.0, and the static weight for the third device is 1.0. In this example using TV viewership data, the static weight is determined based on how often a device is used for watching TV such that, as a device is used to watch TV more often, the static weight for that device will be higher.

Using different data sources of the input data 210 may change the static weight of a device and may change the devices that are assigned a weight. Therefore, different names or notations can be assigned to the static weights based on the data sources used for determining the static weights. For example, a static weight may be referred to as a viewership_impression_based_weight when based on a viewership count as described above. A static weight may be referred to as a viewership_duration_based_weight when based on how long a device is used to watch TV, meaning the static weight is based on a duration that a user watches TV on a particular device. A static weight may be referred to as a prime_time_viewership_impression_based_weight when based on a prime time TV viewership count, meaning the static weight is based on how often a user watches TV on a device during prime time. A static weight may be referred to as a prime_time_viewership_duration_based_weight when based on how long a device is used to watch TV during a certain time, meaning the static weight is based on how long a user watches TV on a device during prime time.

A static weight may be referred to as a linear_ads_impression_based_weight when based on linear ads viewership count, meaning the static weight is based on how often a user watches linear ads on a device. A static weight may be referred to as a cross_device_ads_impression_based_weight when based on cross-device ads viewership count, meaning the static weight is based on how often a user watches cross-device ads. A static weight may be referred to as a bid_price_based_weight when based on bid price, meaning the static weight is based on advertisers that want to play ads on a particular device (such as when a device may have a high static weight value in comparison to the other devices when the device had a high bid price request). A static weight may be referred to as a bid_activity_based_weight when based on bid activity, meaning the static weight is based on how many bid requests a device receives (such as when a device may have a high static weight value in comparison to the other devices when the device had many bid requests). A static weight may be referred to as a cross_device_based_weight when based on a cross-device count, meaning the static weight is based on how many connected devices a primary electronic device has (such as when a primary electronic device may have a high static weight value in comparison to the other devices when the primary electronic device has many connected devices).

A static weight may be referred to as a smartphone_app_usage_based_weight when based on smart phone app usage count or duration, meaning the static weight is based on usage of an application on a smart phone (such as when a smart phone may have a higher static weight value in comparison to the other devices when the smart phone has a large application usage history). A static weight may be referred to as a smarttv_app_usage_based_weight when based on TV app usage count or duration, meaning the static weight is based on usage of application on a smart TV (such as when a smart TV may have a high static weight value in comparison to the other devices when the smart TV has a large application usage history). A static weight may be referred to as a game_usage_based_weight when based on game usage count or duration, meaning the static weight is based on the game usage history (such as when a static weight for a device may increase in comparison to the other devices when games are played more often or for longer periods of time on that device). A static weight may be referred to as a demography_based_weight when based on various factors such as location, age, gender, education, and the like. For example, a static weight may be based on region distribution, and devices in larger-populated states can have larger static weight values than devices from smaller-populated states.

The various operations of the process 220*a* shown in FIG. 2B can be implemented in any suitable manner. For example, each of the operations of the process 220*a* can be implemented or supported using one or more software applications or other software instructions that are executed by at least one processor 120 of the electronic device 101, server 106, or other device. In other embodiments, at least some of the operations of the process 220*a* can be implemented or supported using dedicated hardware components. In general, the operations of the process 220*a* can be performed using any suitable hardware or any suitable combination of hardware and software/firmware instructions.

Although FIG. 2A illustrates one example of a sampling device 200, various changes may be made to FIG. 2A. For example, FIG. 2A is merely meant to illustrate one example of the type of device that may be used for determining how to perform device sampling. Although FIG. 2B illustrates one example of a process 220*a* for determining static weights for electronic devices, various changes may be made to FIG. 2B. For instance, while shown as a series of steps, various steps in FIG. 2B may overlap, occur in parallel, occur in a different order, or occur any number of times.

Figure 3:
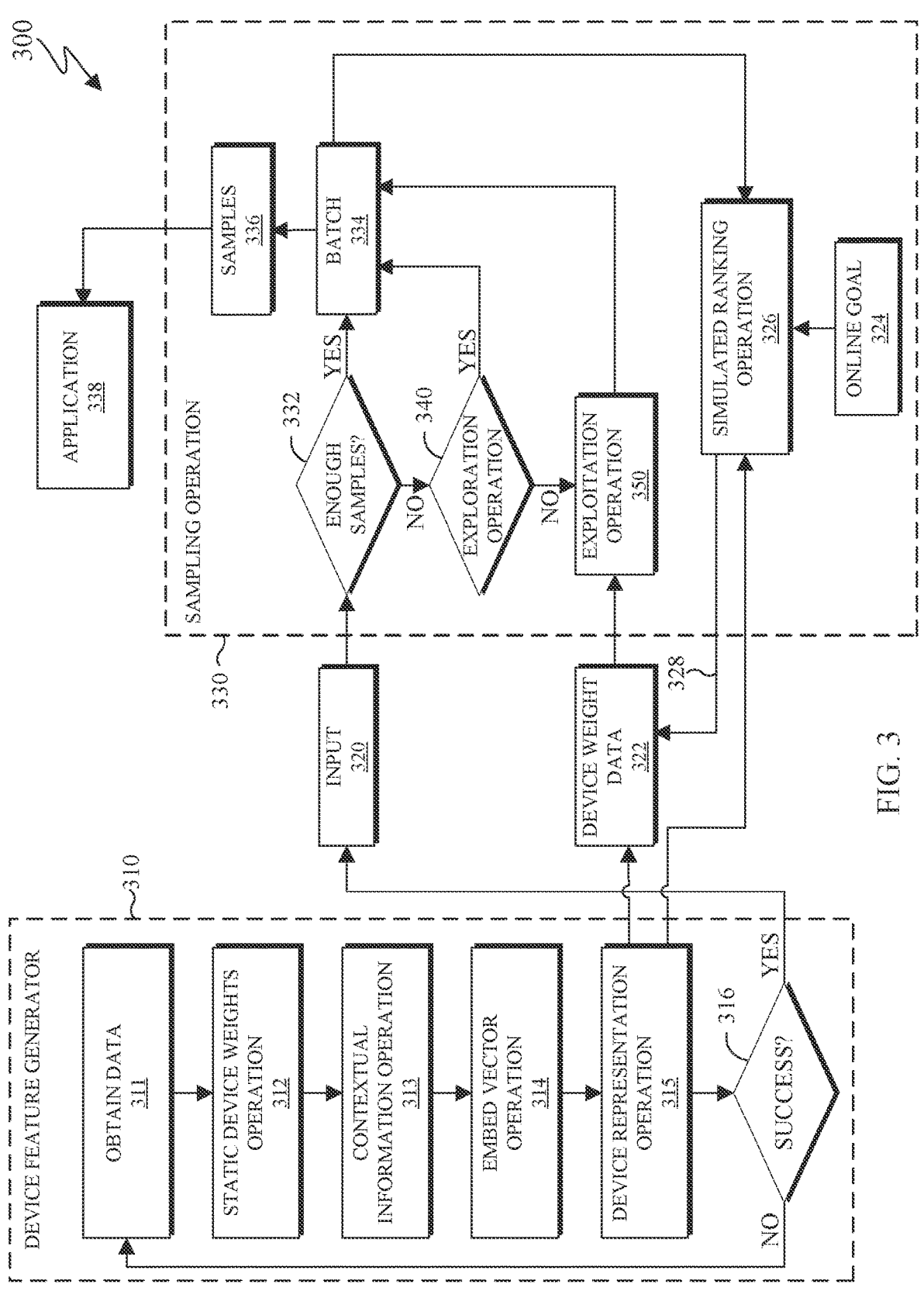
FIG. 3 illustrates an example sampling process in accordance with this disclosure.

FIG. 3 illustrates an example sampling process 300 in accordance with this disclosure. For ease of explanation, the sampling process 300 may be described as being used in the network configuration 100 of FIG. 1, which might be used in or with the sampling device 200 of FIG. 2A. However, the sampling process 300 may be used with any suitable device(s) and in any suitable system(s).

As shown in FIG. 3, the sampling process 300 is generally used to identify, from a plurality of devices, one or more devices that represent the plurality of devices. In this example, a device feature generator 310 generates vectors representing the devices, and the vectors are provided to a sampling operation 330. The sampling operation 330 identifies one or more devices that will be used as representatives of the plurality of devices. The identified devices are used by an application 338 for extracting behavioral information therefrom.

In this example, the device feature generator 310 initially obtains data 311, which may be the same as or similar to the input data 210 of FIG. 2A. For example, the obtained data 311 may represent various types of data, such as TV viewership data, cross-device data, liner ads viewership data, cross-device ads viewership data, application usage data, game usage data, demographic data, and the like. The obtained data 311 can be provided to a static device weights operation 312, which may be the same as or similar to the ranking operation 220 of FIG. 2A. The static device weights operation 312 generates static weights for the devices, and each device may have a single static weight or multiple static weights. For example, a single device can have one or more of the viewership_impression_based_weight, viewership_duration_based_weight, prime_time_viewership_impression_based_weight, and other static weights described above.

The obtained data 311 can also be provided to a contextual information operation 313. The contextual information operation 313 obtains contextual information, such as demography data, associated with the users of the devices. The contextual information can include locations, dates, ages, education, and the like.

The contextual information can be provided to an embed vector operation 314, which generates vectors representing the demographic data associated with the users of the devices. For example, the embed vector operation 314 can apply a "one hot encoding" on the gender of a user and apply a vector generation process on the city and state of the user. In some embodiments, the vector generation process can use a Word2Vec process. In particular embodiments, the embed vector operation 314 uses the following syntax for generating one or more vectors representing the demography data associated with a user of a device:

gender: if Female [1, 0], else [0, 1]
age: if age 10-19, [1, 0, 0, 0, 0]. Elif age 20-29, [0, 1, 0, 0, 0] . . . .
state: if CA [0.1, 0.1, 0.0, −1.0 . . . ] . . . .
city: if Irvine [0.1, 0.1, 0.0, 1.0 . . . ] . . . .

The demographic vectors are provided to a device representation operation 315, which combines device weights and demographic vectors into a single vector for each device. For example, a single device can be represented as a vector that includes its device ID, its one or more static weights, and values that represents the various demographic information associated with the user of the device. As a particular example, a vector for a device may be expressed as:

Device_1, 0.22, 0.22, 0.5, . . . , [1, 0], [0, 1, 0, 0, 0,], [0.1, 0.1, 0.0, −1.0 . . . ], [0.1, 0.1, 0.0, 1.0 . . . ] . . . .

Here, device_1 represents the device ID, and the values 0.22, 0.22, and 0.5 represent three different static weights. Using the example described in the syntax above, the vector

[1,0] is the gender vector and indicates that the device belongs to a female, the vector [0, 1, 0, 0, 0,] is the age vector and indicates that the device belongs to a user who is between the ages of 20 and 29, the vector [0.1, 0.1, 0.0, −1.0 . . . ] is the state vector and indicates that the device is currently located in California, and the vector [0.1, 0.1, 0.0, 1.0 . . . ] is the city vector and indicates that the device is currently located in the city of Irvine.

The various information generated for each device represents device weight data 322, which may be stored in a database or other storage (such as the memory 130 of FIG. 1). The device weight data 322 can include the demographic vectors and the static weights for the devices. In some embodiments, the device weight data 322 can also include dynamic weights for the devices that are generated by a simulated ranking operation 326, which is discussed in greater detail below.

In operation 316, a determination is made whether the device representation operation 315 successfully generated vectors that represent the devices. If a problem is encountered, additional data 311 may be obtained and processed. For example, if a network issue occurs while the data 311 is obtained, the static weights are identified, or the vectors are embedded with contextual information, this may cause additional data 311 to be needed. Upon determining that the device representation operation 315 successfully generated vectors, the operation 316 provides input 320 into the sampling operation 330. The input 320 can include one or more inputs that are provided to the sampling operation 330. In some embodiments, the input 320 includes a sample ratio, which may be predetermined and may specify a number of devices that are to be sampled by the sampling operation 330. For example, if the universe of devices includes one million devices and the predetermined sample ratio is 50%, the sampling operation 330 can select 500,000 devices. The sampling operation 330 may therefore continue selecting devices until the sample ratio is satisfied. Also, in some embodiments, the input 320 includes an epsilon value, which may be predetermined and may indicate how many of the devices are identified for sampling via an exploration operation 340 or an exploitation operation 350. In some cases, the epsilon value can be an e-greedy process. For example, if the epsilon value is 0.7, 70% of the devices are sampled via the exploration operation 340, and 30% of the devices are selected by the exploitation operation 350. Further, in some embodiments, the input 320 includes a model ratio value, which may be predetermined and may specify a number of devices that are to be used during a particular exploitation operation 350. For example, based on the value of the model ratio, the exploitation operation 350 may identify a percentage of devices using a deep reinforcement learning and a percentage of the devices using a Monte Carlo model. The model ratio value is described in greater detail below with reference to FIG. 6.

The sample ratio from the input 320 is provided to an enough samples operation 332, which determines whether the number of devices that are within samples 336 satisfies the sample ratio. The samples 336 can be represent the devices to be sampled, such as when the samples 336 represents the list of sampled devices 280 of FIG. 2. When the enough samples operation 332 determines that the number of identified devices in the samples 336 does not satisfy the sample ratio, the exploration operation 340 may use the epsilon value from the input 320 to determine whether a device is to be randomly identified. For example, the exploration operation 340 can compare the epsilon value from the input 320 to a random value in order to determine whether a device is to be randomly selected. As a particular example, when the epsilon value is 0.7 and the random value is higher than 0.7, the exploration operation 340 can decide to add a device by random chance to a batch 334. On the other hand, if the random value was lower than 0.7, the exploration operation 340 may pass the device selection to the exploitation operation 350.

The exploitation operation 350 selects devices based on a deep reinforcement learning, a Monte Carlo model, or a combination thereof. In some embodiments, the exploitation operation 350 receives the static weight of a device, the dynamic weight of the device, or both the static and dynamic weights of the device from the device weight data 322 and determines whether to sample that device. The exploitation operation 350 can use one or both the static weight and the dynamic weight to determine whether to sample a particular device. For example, a goal (as provided by an online goal 324) may be to sample active devices that meet a particular gender distribution, and the exploitation operation 350 can use the static weights to identify active devices and dynamic weights to identify devices based on a gender distribution while performing the sampling. The exploitation operation 350 is described in greater detail below with reference to FIGS. 4A, 5, 6, and 7A.

The batch 334 identifies devices based on the outputs of the exploration operation 340 and the exploitation operation 350. The batch 334 may be the same as or similar to the batch 260 of FIG. 2A. The batch 334 stores identified devices and determines whether to add the devices to the samples 336. For example, based on the static and dynamic weights of a device, a device in the batch 334 may be moved to the samples 336 or moved to the simulated ranking operation 326.

The simulated ranking operation 326 determines the dynamic weights for devices. The simulated ranking operation 326 may be the same as or similar to the simulated ranking operation 274 of FIG. 2A. To determine the dynamic weight for a device, the simulated ranking operation 326 may receive the vector for the device from the device representation operation 315 and the online goal 324, which may be the same as or similar to the online goal 272 of FIG. 2A. The simulated ranking operation 326 determines a dynamic weight for a device from the batch 334 according to the online goal 324. For example, if a device from the batch 334 maintains a particular distribution according to the online goal 324, the device may be determined to have a high dynamic weight, such as a value close to one. If the device from the batch 334 causes a particular distribution to deviate from the online goal 324, the device may be determined to have a low dynamic weight, such as a value close to zero. In some embodiments, the simulated ranking operation 326 uses a z-score or Gaussian shape to determine whether a device satisfies and maintains a particular distribution according to the online goal 324. The determined dynamic weights of the devices are provided as part of the device weight data 322.

When the samples operation 332 determines that the number of samples stored in the samples 336 satisfies the sample ratio, an application 338 is executed. The application 338 can perform one or more operations such as lookalike, targeting, ACR fingerprinting, and the like for understanding the usage behavior of the selected devices. The usage behavior can be used for identifying a target audience for sales and marketing purposes. This can be targeted for certain demographics or other online goals 324 based on the content that was viewed or played by the selected devices.

Although FIG. 3 illustrates one example of a sampling process 300, various changes may be made to FIG. 3. For example, while shown as a series of steps, various steps in FIG. 3 may overlap, occur in parallel, occur in a different order, or occur any number of times.

Figure 4A:
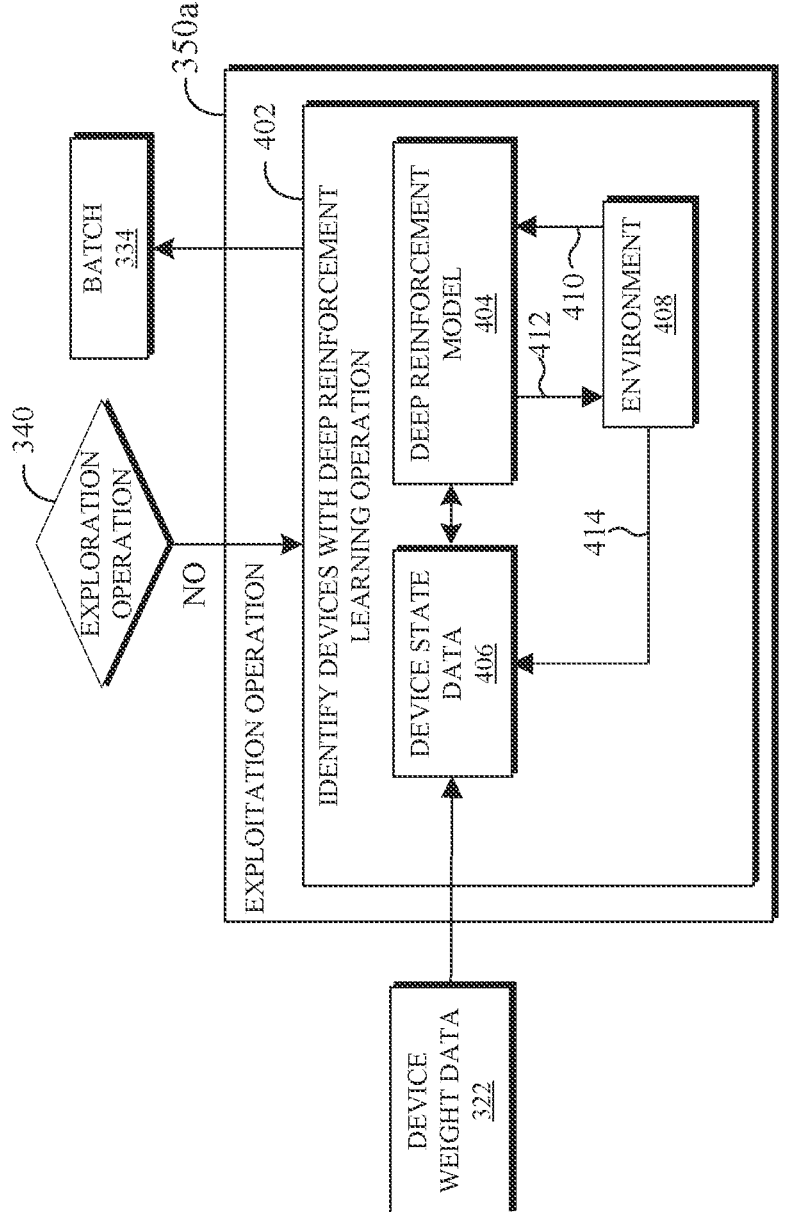
FIG. 4A illustrates an example exploitation operation of FIG. 3 using a deep reinforcement model in accordance with this disclosure.
Figure 4B:
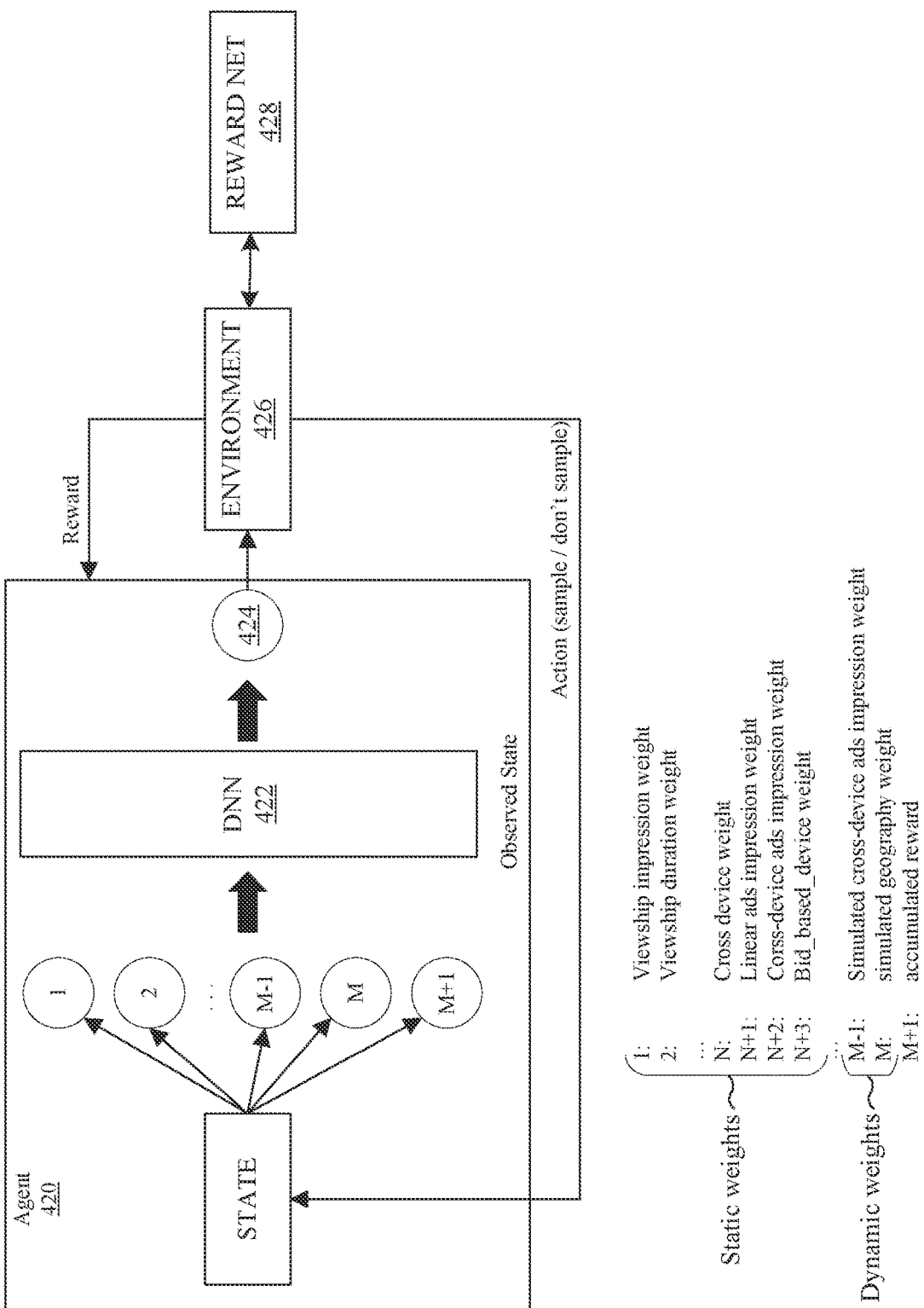
FIGS. 4B, 4C, and 4D illustrate example reinforcement models of FIG. 4A in accordance with this disclosure.
Figure 4C:
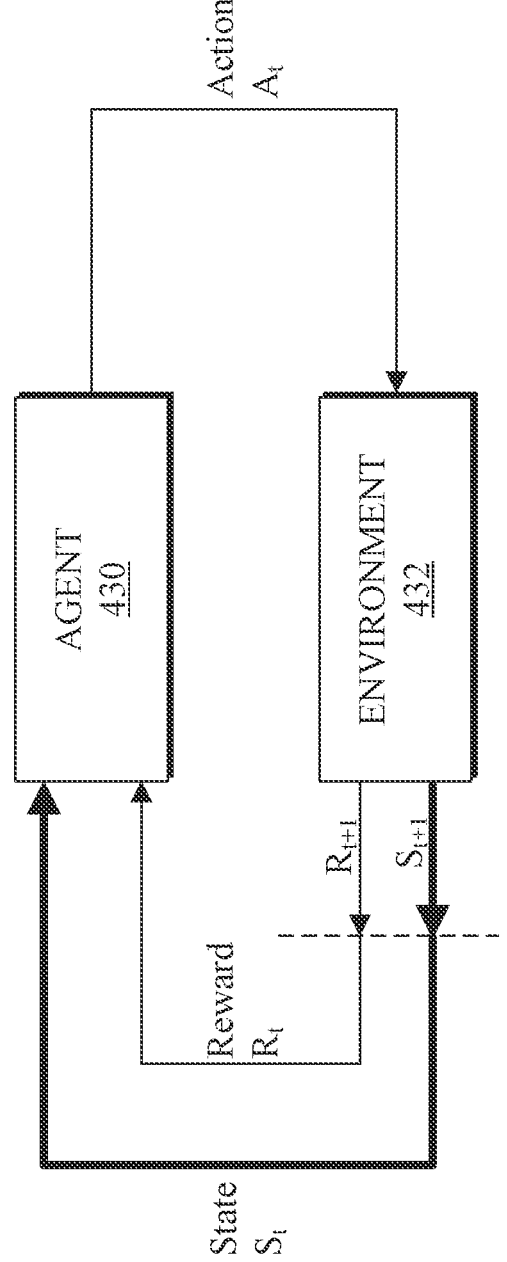
Figure 4D:
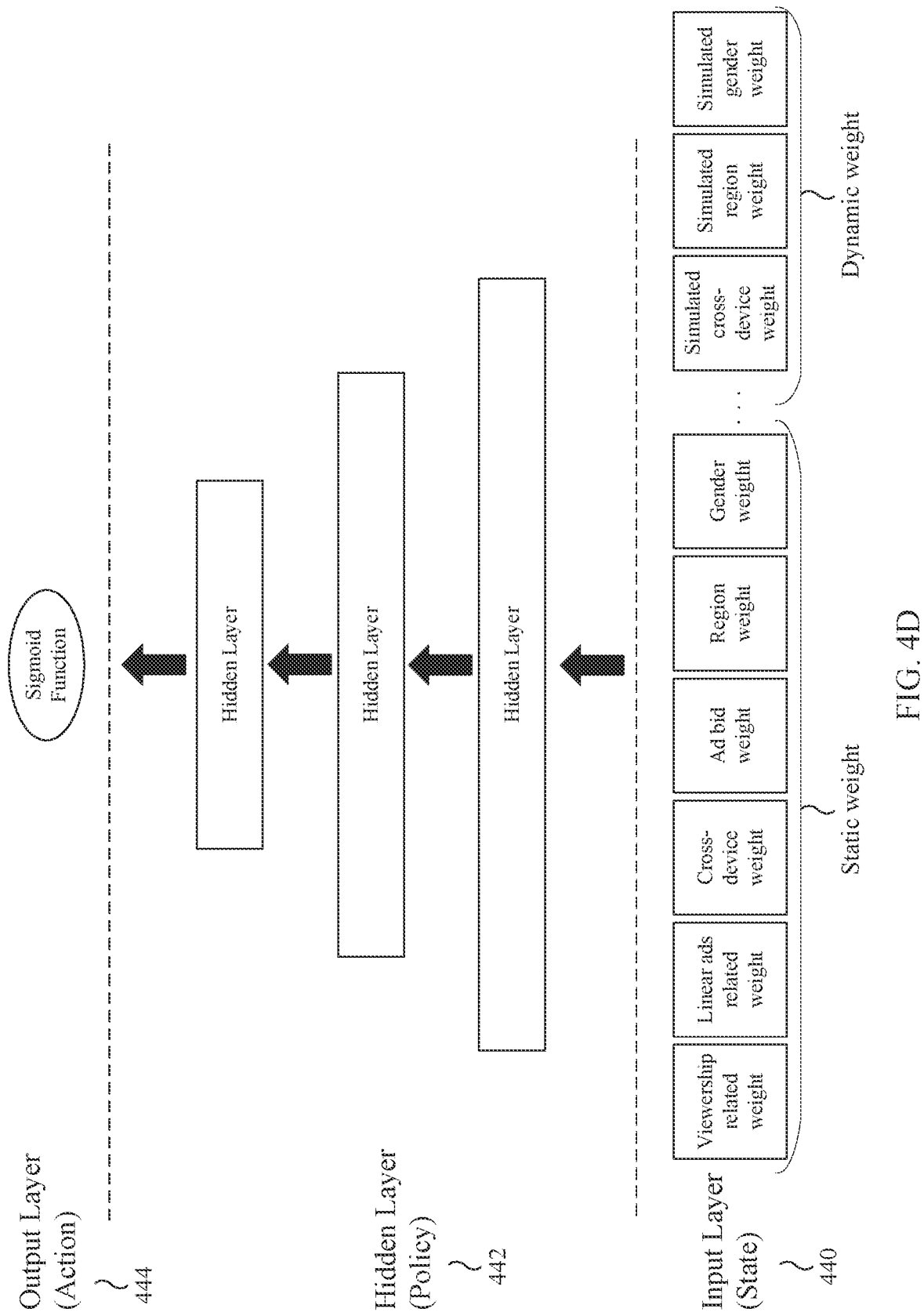

FIG. 4A illustrates an example exploitation operation 350a, which further describes the exploitation operation 350 of FIG. 3. The exploitation operation 350a uses a deep reinforcement model in accordance with this disclosure. FIGS. 4B, 4C, and 4D illustrate example reinforcement models of FIG. 4A in accordance with this disclosure. For ease of explanation, the exploitation operation 350a and its reinforcement models may be described as being used in the network configuration 100 of FIG. 1, which might be used in or with the sampling device 200 of FIG. 2A, the sampling process 300 of FIG. 3, or both. However, the exploitation operation 350a and its reinforcement models may be used with any suitable device(s) and in any suitable system(s).

As shown in FIG. 4A, the exploitation operation 350a performs a deep reinforcement learning operation 402 to identify devices to sample. The exploitation operation 350a is an example of the exploitation operation 350 of FIG. 3. The device weight data 322, exploration operation 340, and the batch 334 were previously described above with respect to FIG. 3. The deep reinforcement learning operation 402 includes a deep reinforcement model 404, a device state data 406, and an environment 408. The device state data 406 is the input data for the deep reinforcement model 404. The device state data 406 may or may not be organized differently than the device weight data 322.

The deep reinforcement learning operation 402 can use a neural network, such as a deep neural network (DNN), a convolutional neural network (CNN), a fully convolutional network (FCN), and the like, or other machine learning technique for identifying devices to sample from the device state data 406. As shown in FIG. 4A, the deep reinforcement learning operation 402 uses the deep reinforcement model 404 to identify devices to sample from the device state data 406. The deep reinforcement model 404 determines an action 412 to perform based on the device state data 406. For example, the deep reinforcement model 404 can be used to select a particular device or not select the particular device. When the deep reinforcement model 404 determines to select a device, the device is moved to the batch 334. The deep reinforcement model 404 is also referred to as an agent and is described below with reference to FIGS. 4B and 4D.

The environment 408 determines whether the deep reinforcement model 404 made a good decision regarding a particular action (select or not selecting a particular device). The environment 408 receives the action 412 that the deep reinforcement model 404 determines to perform, and the environment 408 provides a reward 410 to the deep reinforcement model 404 based on the action 412. The reward 410 can be a positive reward (indicating that the deep reinforcement model 404 made a correct decision) or a negative reward (indicating that the deep reinforcement model 404 made an incorrect decision). The environment 408 also provides state data 414 to the device state data 406. The state data 414 can include a device's weight and an accumulated reward. The relationship between the deep reinforcement model 404 and the environment 408 is described below with reference to FIGS. 4B and 4C.

As shown in FIG. 4B, an agent 420 (such as the deep reinforcement model 404 of FIG. 4A) inputs a state, which includes the static weights and the dynamic weights, into a DNN 422 to generate an output 424. An environment 426 (such as the environment 408 of FIG. 4A) determines whether the output 424 of the agent 420 was a good output based on a reward net 428. The reward net 428 determines the reward based on the weights of a device (which was either selected for sampling or not selected for sampling). The environment 426 provides the reward to the agent 420, and the reward can be a positive reward or a negative reward. The environment 426 also provides the action that the agent 420 decided upon back to the state.

As shown in FIG. 4C, an agent 430 (such as the deep reinforcement model 404 of FIG. 4A) and an environment 432 may correspond to the agent 420 and the environment 426 of FIG. 4B. The agent 430 determines whether a device should be sampled based on the static and dynamic weights associated with the device. The decision whether to sample the device is the action. The agent 430 receives a state (such as the static and dynamic weights for a device) and an accumulated reward from the environment 432 and determines the action. For example, if the action is to sample the device, the environment 432 rewards the agent 430 based on whether the device was worthy of being sampled. In this example, if the device was worthy of being sampled, the reward is positive. Otherwise, the reward is negative. As another example, if the action is to not sample the device, the environment 432 rewards the agent 430 based on whether the device was not worthy of being sampled. In this example, if the device was worthy of being sampled, the reward is negative. Otherwise, the reward is positive. The following is an example syntax for how the environment 432 rewards the agent 430.

```
action_from_agent = agent.get_action(state)
decision_from_reward_net = RewardNet.prediction(device_weight)
if action_from_agent == decision_from_reward_net:
    return positive reward
else:
    return negative reward
```

As shown in FIG. 4D, an input layer 440 is the state data that includes static weights and dynamic weights. The state data may be the same as or similar to the device weight data 322 of FIGS. 3 and 4A. A hidden layer 442 represents multiple hidden layers that are used by a deep neural network model, such as the reward net 428 of FIG. 4B, when identifying whether a device selected by the deep reinforcement model 404 is worthy to be selected for sampling. For example, the deep reinforcement model 404 may output a value corresponding to a device. Based on the value, an output layer 444 can use a sigmoid function or other function to determine whether the device is worthy to be sampled. The sigmoid function or other function can be predefined. For example, the sigmoid function could be set to 0.5. In this example, if the value that is output from the hidden layer 442 for a device is greater than or equal to 0.5, the device is identified as being selected for sampling. Otherwise, the device is identified as a device that is not to be selected for sampling.

Although FIGS. 4A-4D illustrate one example of an exploitation operation 350*a* using a deep reinforcement model and its associated reinforcement models, various changes may be made to FIGS. 4A-4D. For example, the exploitation operation 350*a* may use any other suitable reinforcement model.

Figure 5:
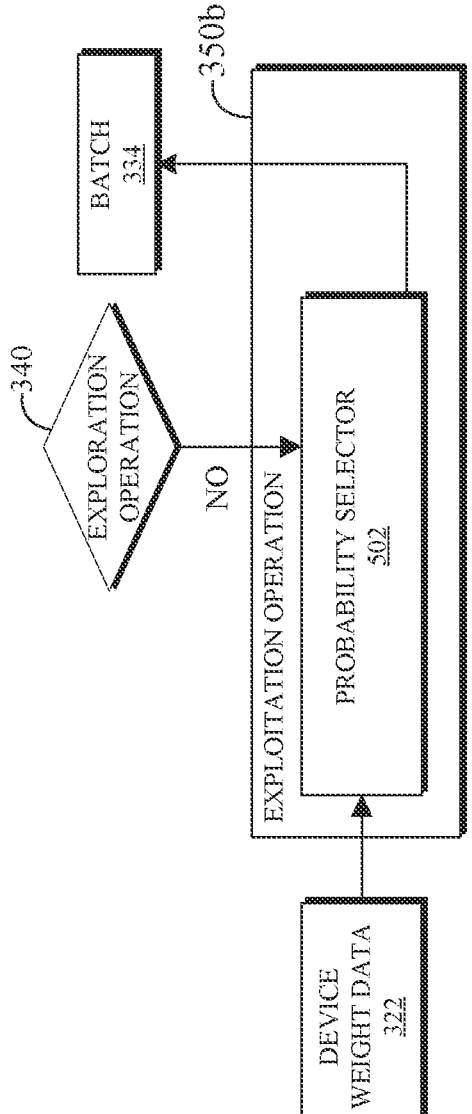
FIG. 5 illustrates an example exploitation operation of FIG. 3 using a Monte Carlo model in accordance with this disclosure.

FIG. 5 illustrates an example exploitation operation 350*b*, which further describes the exploitation operation 350 of FIG. 3. The exploitation operation 350*b* uses a Monte Carlo model in accordance with this disclosure. For ease of explanation, the exploitation operation 350*b* may be described as being used in the network configuration 100 of FIG. 1, which might be used in or with the sampling device 200 of FIG. 2A, the sampling process 300 of FIG. 3, or both. However, the exploitation operation 350*b* may be used with any suitable device(s) and in any suitable system(s).

As shown in FIG. 5, the exploitation operation 350*b* performs a probability selector operation 502 to identify devices to sample. The exploitation operation 350*b* is an example of the exploitation operation 350 of FIG. 3. The device weight data 322, exploration operation 340, and the batch 334 were previously described above with respect to FIG. 3. The probability selector operation 502 can be similar to a Monte Carlo process for identifying devices to sample by probability using their dynamic weights and the static weights.

Initially, the probability selector operation 502 may determine the sum of the static and dynamic weights of each device. In some embodiments, the probability selector operation 502 uses Equation (6) below for determining the sum of the static and dynamic weights of each device.

$$\text{Weight}_d = \sum\nolimits_{i=1}^{N} \propto_i * w_i \tag{6}$$

Here, N is the number of weights, w is the static weight and/or the dynamic weight, d is the particular device, and $\propto$ is the importance of the weight. In some embodiments, the probability selector operation 502 prioritizes one type of weight over another weight based on the value of oc. After determining the sum of the static and dynamic weights of each device, the probability selector operation 502 determines the weight of all devices. In some embodiments, the probability selector operation 502 uses Equation (7) below for determining the weight of all devices.

$$\text{Total\_Weight} = \sum\nolimits_{d=1}^{D} \text{Weight}_d \tag{7}$$

In Equation (7), D is the number of devices.

After determining the weight of all devices, the probability selector operation 502 may determine a ratio for each device. The ratio is the weight of a particular device (as determined by Equation (6)) to the total weight of all devices (as determined by Equation (7)). The ratio of a device can represent a probability that the device will be selected. In some embodiments, the probability selector operation 502 uses Equation (8) below for determining the ratio.

$$\text{Device\_Weight\_By\_Total} = \left[ \frac{\text{Weight}_1}{\text{Total\_Weight}}, \frac{\text{Weight}_2}{\text{Total\_Weight}}, \right. \tag{8}$$
$$\left. \dots, \frac{\text{Weight}_D}{\text{Total\_Weight}} \right]$$

After determining the ratio, the probability selector operation 502 may randomly choose devices based on the ratio. In some embodiments, the probability selector operation 502 uses the probabilities for identifying devices to be sampled. For example, the probability selector operation 502 may use the syntax below to identify devices for sampling.

```
numpy.random.choice  (candidate_list,  sample_size,
    probability_list=Device_Weight_By_Total)
```

If the probability selector operation 502 selects a device, the device ID can be stored in the batch 334.

Although FIG. 5 illustrates one example of an exploitation operation 350b using a Monte Carlo model, various changes may be made to FIG. 5. For example, the exploitation operation 350b may use any other suitable probability calculation.

Figure 6:
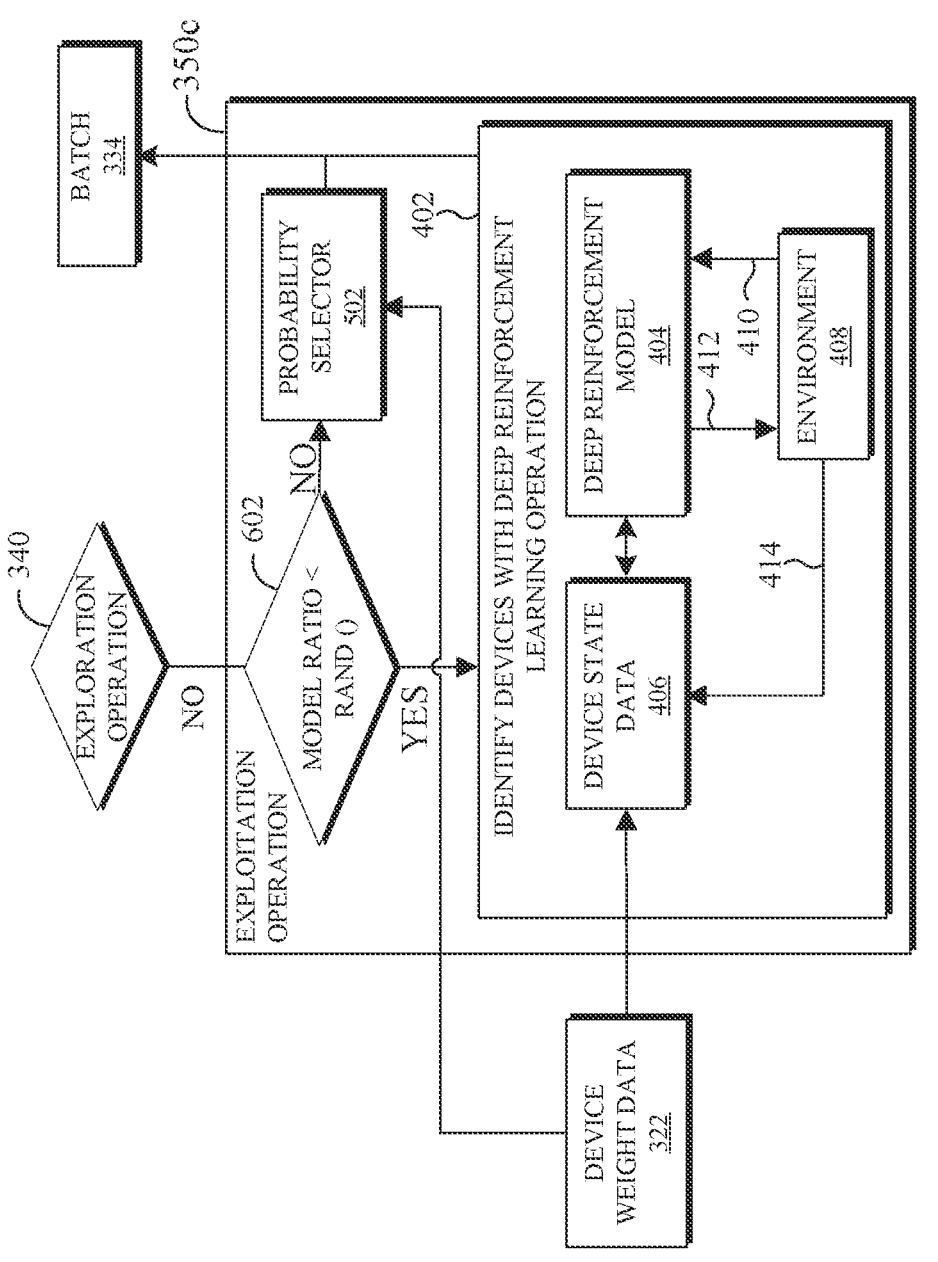
FIG. 6 illustrates an example exploitation operation of FIG. 3 using either the deep reinforcement model or the Monte Carlo model in accordance with this disclosure.

FIG. 6 illustrates an example exploitation operation 350c, which further describes the exploitation operation 350 of FIG. 3. The exploitation operation 350c uses either the deep reinforcement model or the Monte Carlo model in accordance with this disclosure. For ease of explanation, the exploitation operation 350c may be described as being used in the network configuration 100 of FIG. 1, which might be used in or with the sampling device 200 of FIG. 2A, the sampling process 300 of FIG. 3, or both. However, the exploitation operation 350c may be used with any suitable device(s) and in any suitable system(s).

As shown in FIG. 6, the exploitation operation 350c performs both a probability selector operation 502 (as described in FIG. 5 above) and a deep reinforcement learning operation 402 (as described in FIG. 4A-4D above) to identify devices to be sampled. The exploitation operation 350c obtains a model ratio value from the input 320 of FIG. 3. In some embodiments, the model ratio value is a predetermined value. The exploitation operation 350c compares the model ratio value from the input 320 to a random value in order to determine whether the probability selector operation 502 or the deep reinforcement learning operation 402 is used to inspect a device and determine whether to sample the device. For example, when the model ratio value is 0.7 and the random value is higher than 0.7, the exploitation operation 350 may decide to use the probability selector operation 502. If the random value is lower than 0.7, the exploitation operation 350 may decide to use the deep reinforcement learning operation 402. If the probability selector operation 502 or the deep reinforcement learning operation 402 determines to select a device, the device ID can be stored in the batch 334.

Although FIG. 6 illustrates one example of an exploitation operation 350c using either the deep reinforcement model or the Monte Carlo model, various changes may be made to FIG. 6. For example, the exploitation operation 350c may use any suitable reinforcement model and any suitable probability calculation.

Figure 7A:
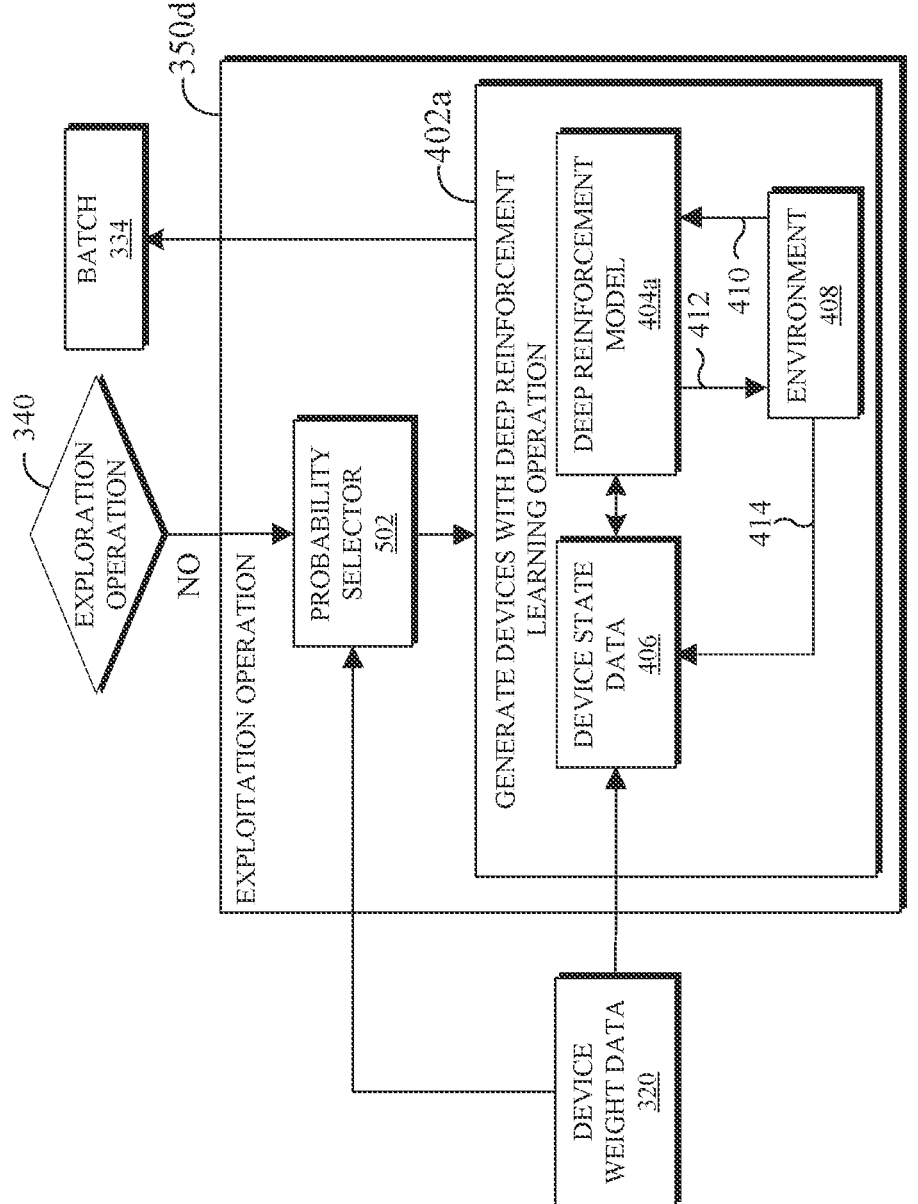
FIG. 7A illustrates an example exploitation operation of FIG. 3 using the deep reinforcement model and the Monte Carlo model in accordance with this disclosure.
Figure 7B:
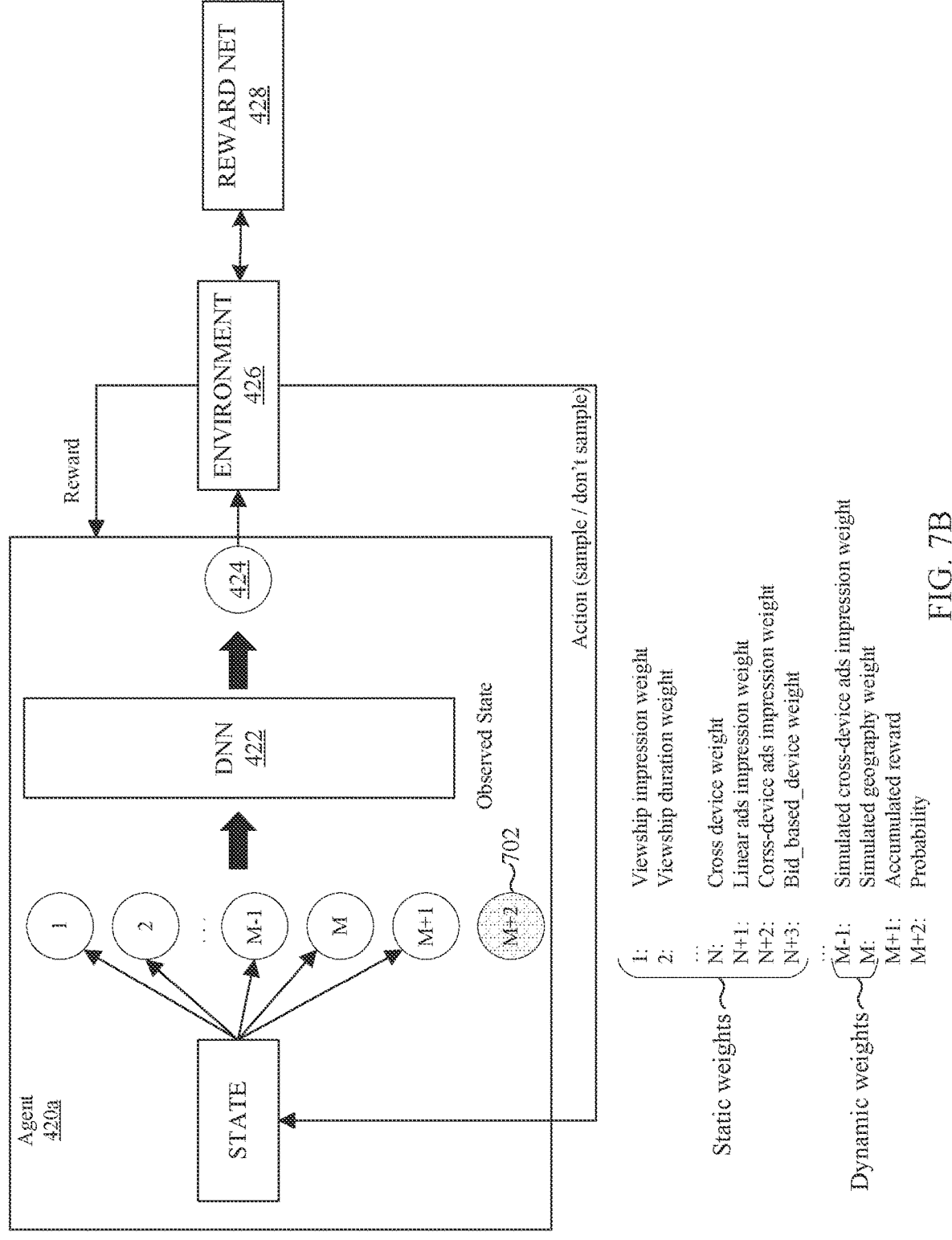
FIG. 7B illustrates an example reinforcement model of FIG. 7A in accordance with this disclosure.

FIG. 7A illustrates an example exploitation operation 350d of FIG. 3, which further describes the exploitation operation 350. The exploitation operation 350d uses the deep reinforcement model and the Monte Carlo model in accordance with this disclosure. FIG. 7B illustrates an example reinforcement model of FIG. 7A in accordance with this disclosure. For ease of explanation, the exploitation operation 350d and its reinforcement model may be described as being used in the network configuration 100 of FIG. 1, which might be used in or with the sampling device 200 of FIG. 2A, the sampling process 300 of FIG. 3, or both. However, the exploitation operation 350d and its reinforcement model may be used with any suitable device(s) and in any suitable system(s).

As shown in FIG. 7A, the exploitation operation 350d performs both a probability selector operation 502 (as described in FIG. 5 above) and deep reinforcement learning operation 402a (as described in FIG. 4A-4D above) to identify devices to sample. The deep reinforcement learning operation 402a may be the same as or similar to the deep reinforcement learning operation 402 of FIG. 4A.

Initially, the probability selector operation 502 may determine the ratios of the devices, such as by using Equations (6), (7), and (8) to determine the ratios for the devices. The ratios are provided as additional inputs into the deep reinforcement learning operation 402a. The deep reinforcement learning operation 402a includes a deep reinforcement model 404a, a device state data 406, and an environment 408. The device state data 406, the environment 408, the reward 410, the action 412, and the state data 414 are described with reference to FIG. 4A above.

The deep reinforcement learning operation 402a can use a neural network or other machine learning technique for identifying devices to sample from the device state data 406. As shown in FIG. 7A, the deep reinforcement learning operation 402a uses the deep reinforcement model 404a to identify devices to sample from the device state data 406. The deep reinforcement model 404a determines an action to perform based on the device state data 406. For example, the device state data 406 may include the static weights for the devices, the dynamic weights for the devices, and the ratios (probabilities) for the devices as determined by the probability selector operation 502. The deep reinforcement model 404a uses the static weights for the devices, the dynamic weights for the devices, and the ratios for the devices to identify devices to select for sampling. When the deep reinforcement model 404a determines to select a device, the device can be identified in the batch 334.

As shown in FIG. 7B, an agent 420a may represent the deep reinforcement model 404a of FIG. 7A. The DNN 422, output 424, environment 426, and reward net 428 were described above with reference to FIG. 4B. The agent 420a inputs a state, which includes the static weights, the dynamic weights, and probabilities 702 (as determined by the probability selector operation 502) into the DNN 422 to generate an output 424. As such, the agent 420a uses the static weights, the dynamic weights, and the probabilities 702 for identifying devices to sample.

Although FIGS. 7A and 7B illustrates one example of an exploitation operation 350d using the deep reinforcement model and the Monte Carlo model, various changes may be made to FIGS. 7A and 7B. For example, the exploitation operation 350d may use any suitable reinforcement model and any suitable probability calculation.

Figure 8:
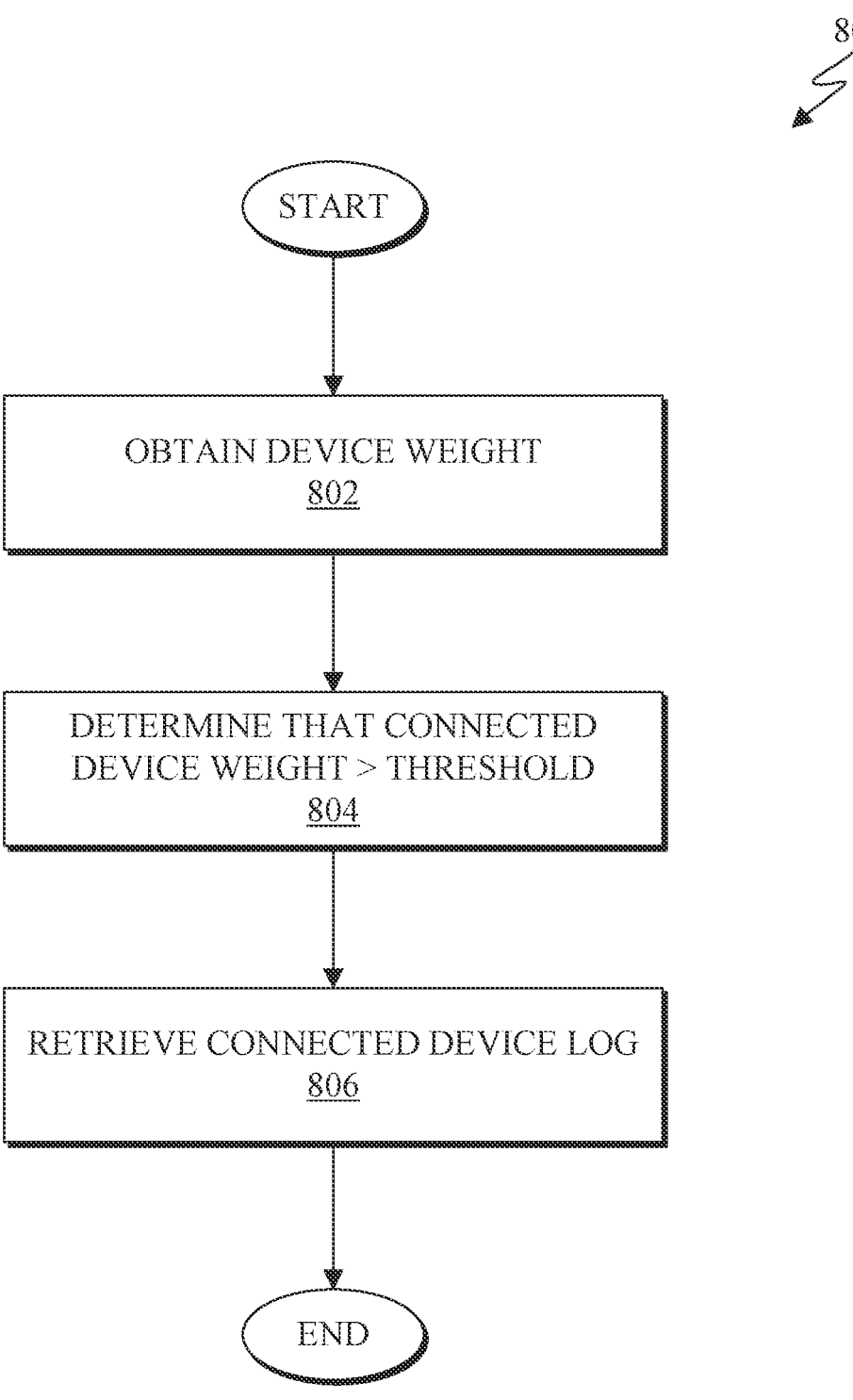
FIG. 8 illustrates an example process for regulating user data in accordance with this disclosure.

FIG. 8 illustrates an example process 800 for regulating user data in accordance with this disclosure. For ease of explanation, the process 800 of FIG. 8 is described as being performed by or involving the use of the electronic device 101 shown in FIG. 1. However, the process 800 shown in FIG. 8 could be used with any other suitable electronic device and in any other suitable system, such as when the process 800 is performed by the server 106.

As shown in FIG. 8, a device log can be regulated based on the sampling policies. In some embodiments, a protocol can be generated for regulating the device data log transmission from an electronic device (such as the electronic device 101) to a server (such as the server 106 of FIG. 1) based on a sampling policy. In the following example, the generated protocol can limit device transmissions based on a device's weight for connected devices. For example, by using connected_device weight, the server can decide whether to retrieve the connected device's logs from an electronic device in order to save server and network costs for accessing the connected device logs. An electronic device with a large connected_device weight indicates that the device has many connected devices compared to a device with a small connected_device weight. If the device has few connected devices, it can have a small number of connected devices' interaction logs that may not be worth retrieving. If a device has many connected devices, there is a larger possibility that the connected devices' interaction logs would be worth retrieving.

In step 802, the server can obtain the weights of a device. In step 804, the server compares a connected device weight to a threshold. Based on the comparison, the server determines, in step 806, whether to receive the connected device logs. For example, if a connected device weight is larger than the threshold, the server determines to receive the connected device logs. If the connected device weight is smaller than the threshold, the server determines not to receive the connected device logs.

Although FIG. 8 illustrates one example of a process 800 for regulating user data, various changes may be made to FIG. 8. For example, while shown as a series of steps, various steps in FIG. 8 may overlap, occur in parallel, occur in a different order, or occur any number of times.

Figure 9:
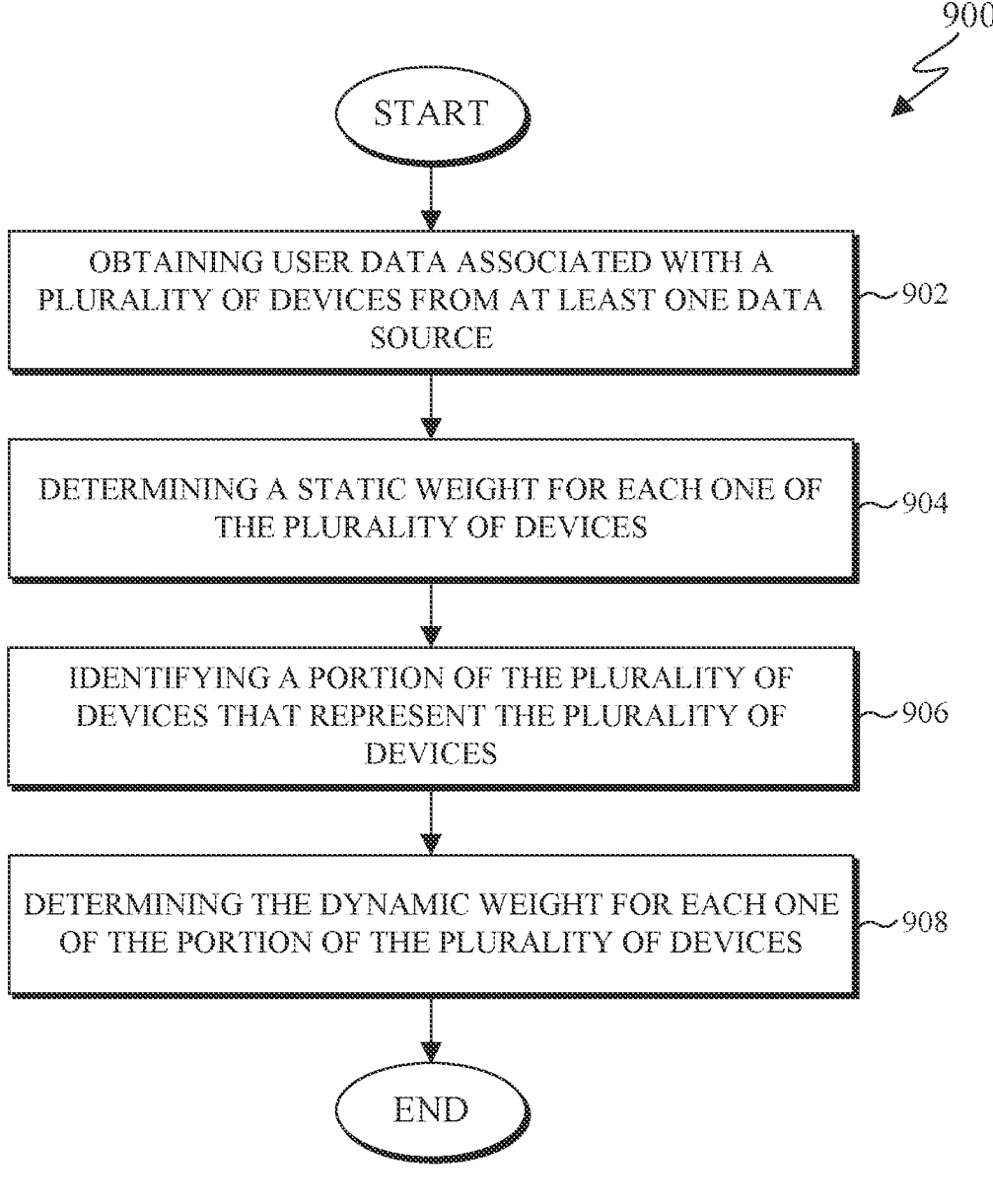
FIG. 9 illustrates an example process for device sampling in accordance with this disclosure.

FIG. 9 illustrates an example process 900 for device sampling in accordance with this disclosure. For ease of explanation, the process 900 of FIG. 9 is described as being performed by or involving the use of the electronic device 101 shown in FIG. 1. However, the process 900 shown in FIG. 9 could be used with any other suitable electronic device and in any other suitable system, such as when the process 900 is performed by the server 106.

As shown in FIG. 9, in step 902, the server 106 obtains usage information associated with a plurality of devices. The usage information can be from at least one data source. In step 904, the server 106 determines a static weight for one of the plurality of devices. In some embodiments, the server 106 determines multiple static weights for one of the devices based on different usage information. In some embodiments, the server 106 determines the static weights for all of the devices in step 904.

In step 906, the server 106 identifies a portion of the plurality of devices that represents the plurality of devices. The server 106 identifies the portion of the plurality of devices based on the static weights, dynamic weights, or the static and dynamic weights of the devices. The portion of the plurality of devices that is identified can be used for identifying usage behaviors of users of the devices. In some embodiments, the portion of the plurality of devices is identified based on a deep reinforcement learning, a Monte Carlo model, or a combination thereof.

In step 908, the server 106 determines the dynamic weight for each of the portion of the plurality of devices while the portion of the plurality of devices is identified. The dynamic weights are determined using at least one data source. In some embodiments, the dynamic weights are based on demographic information, while the static weights are based on usage information. In other embodiments, the dynamic weights and the static weights use the same data source. In yet other embodiments, the dynamic weights and the static weights use different data sources.

Although FIG. 9 illustrates one example of a process 900 for device sampling, various changes may be made to FIG. 9. For example, while shown as a series of steps, various steps in FIG. 9 may overlap, occur in parallel, occur in a different order, or occur any number of times.

Although the present disclosure has been described with reference to various example embodiments, various changes and modifications may be suggested to one skilled in the art. It is intended that the present disclosure encompass such changes and modifications as fall within the scope of the appended claims.

What is claimed is:

1. A method comprising:

obtaining first user data associated with a plurality of devices from multiple data sources;

determining a static weight for each of the plurality of devices based on at least one source of the multiple data sources;

identifying a portion of the plurality of devices that represents the plurality of devices based on both the static weight and a dynamic weight each exceeding one or more first thresholds, wherein the dynamic weight for each device of the portion of the plurality of devices is determined while identifying the portion of the plurality of devices and is based on one or more sources of the multiple data sources; and regulating device interaction data received via a network from the portion of the plurality of devices that represents the plurality of devices based on a number of connected devices indicated by the static weight, wherein device interaction data is retrieved for each device of the portion of the plurality of devices for which the number of connected devices to the each device exceeds a second threshold.

2. The method of claim 1, wherein determining the static weight for each of the plurality of devices comprises:

determining a session count associated with each of the plurality of devices based on the first user data from the at least one source;

comparing the session count of each respective device of the plurality of devices to the session count of other devices of the plurality of devices; and determining the static weight for each of the plurality of devices based on the comparison.

3. The method of claim 1, wherein determination of the dynamic weight for each device of the portion of the plurality of devices further comprises:

obtaining a distribution goal corresponding to the one or more sources of the multiple data sources; and determining the dynamic weight for each respective device of the portion of the plurality of devices based on whether each subsequent device of the portion of the plurality of devices satisfies the distribution goal.

4. The method of claim 1, wherein:

user behavior representing the plurality of devices is extracted from the first user data corresponding to the portion of the plurality of devices; and identifying the portion of the plurality of devices comprises:

randomly selecting a first subset of the plurality of devices according to a predefined parameter; and selecting a second subset of the plurality of devices based on at least one of a deep reinforced learning analysis or a Monte Carlo analysis.

5. The method of claim 4, wherein selecting the second subset of the plurality of devices based on the deep reinforced learning analysis comprises:

determining, by a neural network, whether to select a first device of the plurality of devices based on the static weight of the first device and the dynamic weight of the first device; and in response to determining whether to select the first device, providing a reward to the neural network based on the static weight of the first device, the dynamic weight of the first device, and the determination.

6. The method of claim 4, wherein selecting the second subset of the plurality of devices based on the Monte Carlo analysis comprises:

identifying an overall weight of each of the plurality of devices based on the static weight of each respective device of the plurality of devices and the dynamic weight of each respective device of the portion of the plurality of devices;

identifying a total weight based on the overall weight of each of the plurality of devices;

comparing the overall weight of each of the plurality of devices to the total weight; and selecting the second subset of the plurality of devices based on the comparison.

7. The method of claim 4, wherein selecting the second subset of the plurality of devices based on both the deep reinforced learning analysis and the Monte Carlo analysis comprises:

identifying an overall weight of each of the plurality of devices based on the static weight of each respective device of the plurality of devices and the dynamic weight of each respective device of the portion of the plurality of devices;

identifying a total weight based on the overall weight of each of the plurality of devices;

comparing the overall weight of each of the plurality of devices to the total weight;

identifying a probability associated with a first device of the plurality of devices based on the comparison, the probability indicating whether the first device will be selected;

determining, by a neural network, whether to select the first device based on the static weight of the first device, the dynamic weight of the first device, and the probability associated with the first device; and in response to determining whether to select the first device, providing a reward to the neural network based on the static weight of the first device, the dynamic weight of the first device, the determination, and the probability associated with the first device.

8. An electronic device comprising: at least one processor configured to:

obtain first user data associated with a plurality of devices from multiple data sources;

determine a static weight for each of the plurality of devices based on at least one source of the multiple data sources;

identify a portion of the plurality of devices that represents the plurality of devices based on both the static weight and a dynamic weight each exceeding one or more first thresholds, wherein the dynamic weight for each device of the portion of the plurality of devices is determined while identifying the portion of the plurality of devices and is based on one or more sources of the multiple data sources; and regulate device interaction data received via a network from the portion of the plurality of devices that represents the plurality of devices based on a number of connected devices indicated by the static weight, wherein device interaction data is retrieved for each device of the portion of the plurality of devices for which the number of connected devices to the each device exceeds a second threshold.

9. The electronic device of claim 8, wherein, to determine the static weight for each of the plurality of devices, the at least one processor is configured to:

determine a session count associated with each of the plurality of devices based on the first user data from the at least one source;

compare the session count of each respective device of the plurality of devices to the session count of other devices of the plurality of devices; and determine the static weight for each of the plurality of devices based on the comparison.

10. The electronic device of claim 8, wherein, for determination of the dynamic weight for each device of the portion of the plurality of devices, the at least one processor is configured to:

obtain a distribution goal corresponding to the one or more sources of the multiple data sources; and determine the dynamic weight for each respective device of the portion of the plurality of devices based on whether each subsequent device of the portion of the plurality of devices satisfies the distribution goal.

11. The electronic device of claim 8, wherein:

the at least one processor is further configured to extract user behavior representing the plurality of devices from the first user data corresponding to the portion of the plurality of devices; and to identify the portion of the plurality of devices, the at least one processor is configured to:

randomly select a first subset of the plurality of devices according to a predefined parameter; and select a second subset of the plurality of devices based on at least one of a deep reinforced learning analysis or a Monte Carlo analysis.

12. The electronic device of claim 11, wherein, to select the second subset of the plurality of devices based on the deep reinforced learning analysis, the at least one processor is configured to:

determine, using a neural network, whether to select a first device of the plurality of devices based on the static weight of the first device and the dynamic weight of the first device; and in response to determining whether to select the first device, provide a reward to the neural network based on the static weight of the first device, the dynamic weight of the first device, and the determination.

13. The electronic device of claim 11, wherein, to select the second subset of the plurality of devices based on the Monte Carlo analysis, the at least one processor is configured to:

identify an overall weight of each of the plurality of devices based on the static weight of each respective device of the plurality of devices and the dynamic weight of each respective device of the portion of the plurality of devices;

identify a total weight based on the overall weight of each of the plurality of devices;

compare the overall weight of each of the plurality of devices to the total weight; and select the second subset of the plurality of devices based on the comparison.

14. The electronic device of claim 11, wherein, to select the second subset of the plurality of devices based on both the deep reinforced learning analysis and the Monte Carlo analysis, the at least one processor is configured to:

identify an overall weight of each of the plurality of devices based on the static weight of each respective device of the plurality of devices and the dynamic weight of each respective device of the portion of the plurality of devices;

identify a total weight based on the overall weight of each of the plurality of devices;

compare the overall weight of each of the plurality of devices to the total weight;

identify a probability associated with a first device of the plurality of devices based on the comparison, the probability indicating whether the first device will be selected;

determine, using a neural network, whether to select the first device based on the static weight of the first device, the dynamic weight of the first device, and the probability associated with the first device; and in response to determining whether to select the first device, provide a reward to the neural network based on the static weight of the first device, the dynamic weight of the first device, the determination, and the probability associated with the first device.

15. A non-transitory computer readable medium containing instructions that when executed cause at least one processor to:

obtain first user data associated with a plurality of devices from multiple data sources;

determine a static weight for each of the plurality of devices based on at least one source of the multiple data sources;

identify a portion of the plurality of devices that represents the plurality of devices based on both the static weight and a dynamic weight each exceeding one or more first thresholds, wherein the dynamic weight for each device of the portion of the plurality of devices is determined while identifying the portion of the plurality of devices and is based on one or more sources of the multiple data sources; and regulate device interaction data received via a network from the portion of the plurality of devices that represents the plurality of devices based on a number of connected devices indicated by the static weight, wherein device interaction data is retrieved for each device of the portion of the plurality of devices for which the number of connected devices to the each device exceeds a second threshold.

16. The non-transitory computer readable medium of claim 15, wherein the instructions that when executed cause the at least one processor to determine the static weight for each of the plurality of devices comprise instructions that when executed cause the at least one processor to:

determine a session count associated with each of the plurality of devices based on the first user data from the at least one source;

compare the session count of each respective device of the plurality of devices to the session count of other devices of the plurality of devices; and determine the static weight for each of the plurality of devices based on the comparison.

17. The non-transitory computer readable medium of claim 15, wherein the instructions for determination of the dynamic weight for each device of the portion of the plurality of devices comprise instructions that when executed cause the at least one processor to:

obtain a distribution goal corresponding to the one or more sources of the multiple data sources; and determine the dynamic weight for each respective device of the portion of the plurality of devices based on whether each subsequent device of the portion of the plurality of devices satisfies the distribution goal.

18. The non-transitory computer readable medium of claim 15, wherein:

the medium further contains instructions that when executed cause the at least one processor to extract user behavior representing the plurality of devices from the first user data corresponding to the portion of the plurality of devices; and the instructions that when executed cause the at least one processor to identify the portion of the plurality of devices comprise instructions that when executed cause the at least one processor to:

randomly select a first subset of the plurality of devices according to a predefined parameter; and select a second subset of the plurality of devices based on at least one of a deep reinforced learning analysis or a Monte Carlo analysis.

19. The non-transitory computer readable medium of claim 18, wherein the instructions that when executed cause the at least one processor to select the second subset of the plurality of devices based on the deep reinforced learning analysis comprise instructions that when executed cause the at least one processor to:

determine, by a neural network, whether to select a first device of the plurality of devices based on the static weight of the first device and the dynamic weight of the first device; and in response to determining whether to select the first device, provide a reward to the neural network based on the static weight of the first device, the dynamic weight of the first device, and the determination.

20. The non-transitory computer readable medium of claim 18, wherein the instructions that when executed cause the at least one processor to select the second subset of the plurality of devices based on the Monte Carlo analysis comprise instructions that when executed cause the at least one processor to:

identify an overall weight of each of the plurality of devices based on the static weight of each respective device of the plurality of devices and the dynamic weight of each respective device of the portion of the plurality of devices;

identify a total weight based on the overall weight of each of the plurality of devices;

compare the overall weight of each of the plurality of devices to the total weight; and select the second subset of the plurality of devices based on the comparison.

\* \* \* \* \*